United States Patent [19]

Rogers

[11] 3,906,208

[45] Sept. 16, 1975

[54] COMPUTING SCALE SYSTEM
[75] Inventor: Robert M. Rogers, Troy, Ohio
[73] Assignee: Hobart Corporation, Troy, Ohio
[22] Filed: Apr. 29, 1974
[21] Appl. No.: 464,767

[52] U.S. Cl............................. 235/151.33; 177/25
[51] Int. Cl.².................. G01G 19/413; G06F 15/20
[58] Field of Search......... 235/151.33; 177/1, 3, 25, 177/4, 26; 340/172.5

[56] References Cited
UNITED STATES PATENTS

| | | | |
|---|---|---|---|
| 3,635,297 | 1/1972 | Salava............................... | 177/25 X |
| 3,715,725 | 2/1973 | Kievit et al. ........................ | 340/147 |
| 3,716,697 | 2/1973 | Weir................................... | 340/147 |
| 3,723,972 | 3/1973 | Chaddha........................... | 340/172.5 |
| 3,725,656 | 4/1973 | Fukuma......................... | 235/151.33 |
| 3,725,866 | 4/1973 | Oldfield, Jr. et al............. | 340/172.5 |
| 3,770,069 | 11/1973 | Loshbough................. | 235/151.33 X |

*Primary Examiner*—Edward J. Wise
*Attorney, Agent, or Firm*—Biebel, French & Bugg

[57] ABSTRACT

A computing scale system is provided for particular utility in connection with a point-of-sale merchandising terminal. The system may include a plurality of scales, each interconnected with a checkout counter and each associated with its own display unit. The display units each have electro-optic displays for displaying weight, price per unit weight and total value. The weight as measured by the scale is transmitted to the display unit for storage and display together with storage and display of price per unit weight information as entered by the display unit keyboard. Associated with one of the display units is a computing unit, which computes total price information for all display units on a time sharing basis. The computing unit generates display unit addresses at each of the display units, and the display units in turn respond with status information. So long as a display unit is in condition for servicing by the computing unit, the computing unit continues servicing that display. When a total value computation has been completed, then that total value is transmitted, together with the appropriate display unit address, to the display unit being serviced. If at any time during servicing, a display unit responds with improper status information, then the computing unit enters a program abort loop and begins servicing another display unit.

20 Claims, 28 Drawing Figures

PATENTED SEP 16 1975 3,906,208

SHEET 1

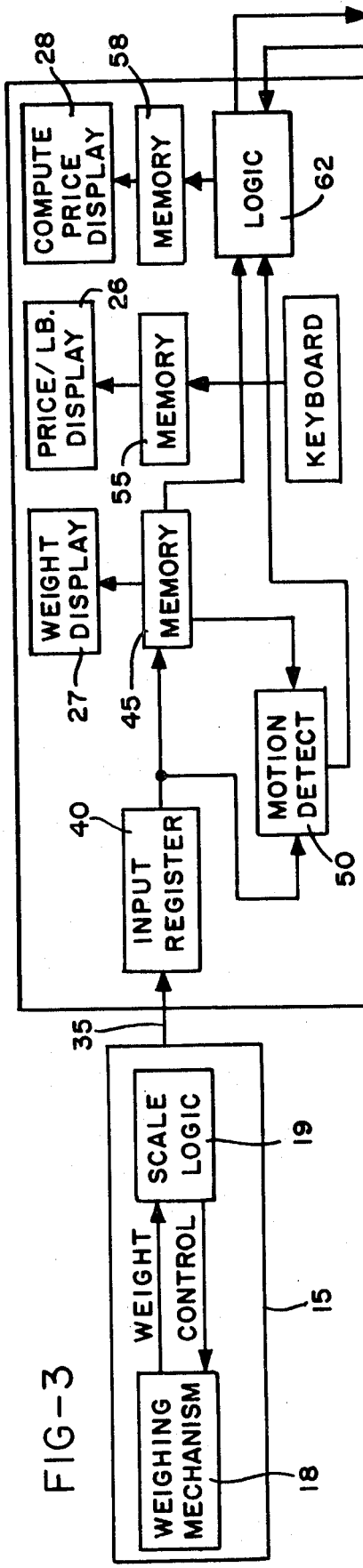
FIG-3
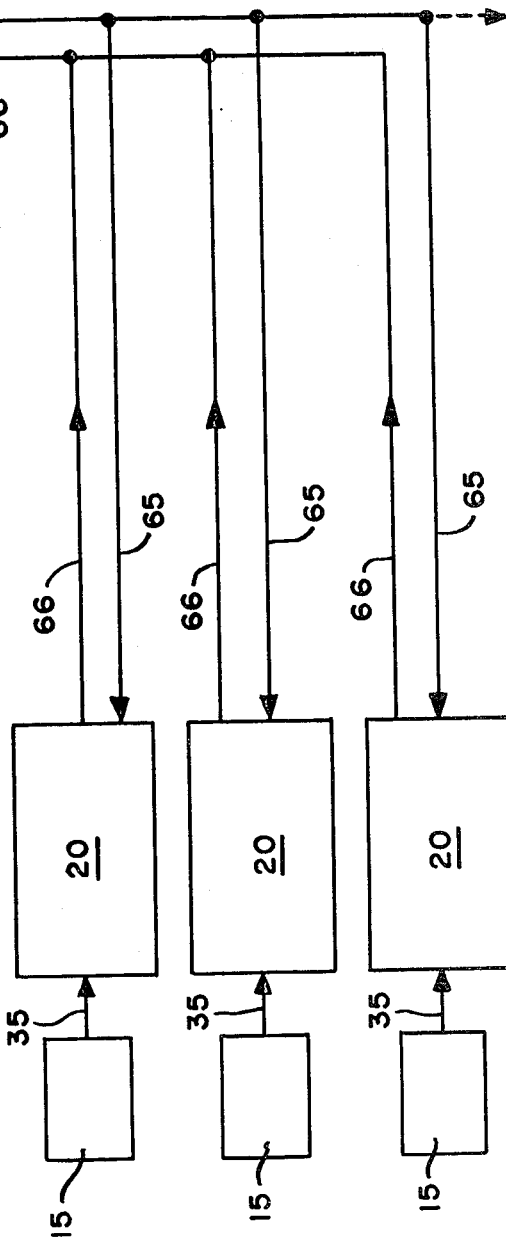
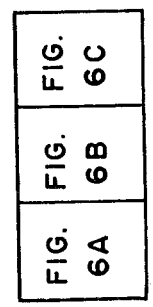
FIG-12

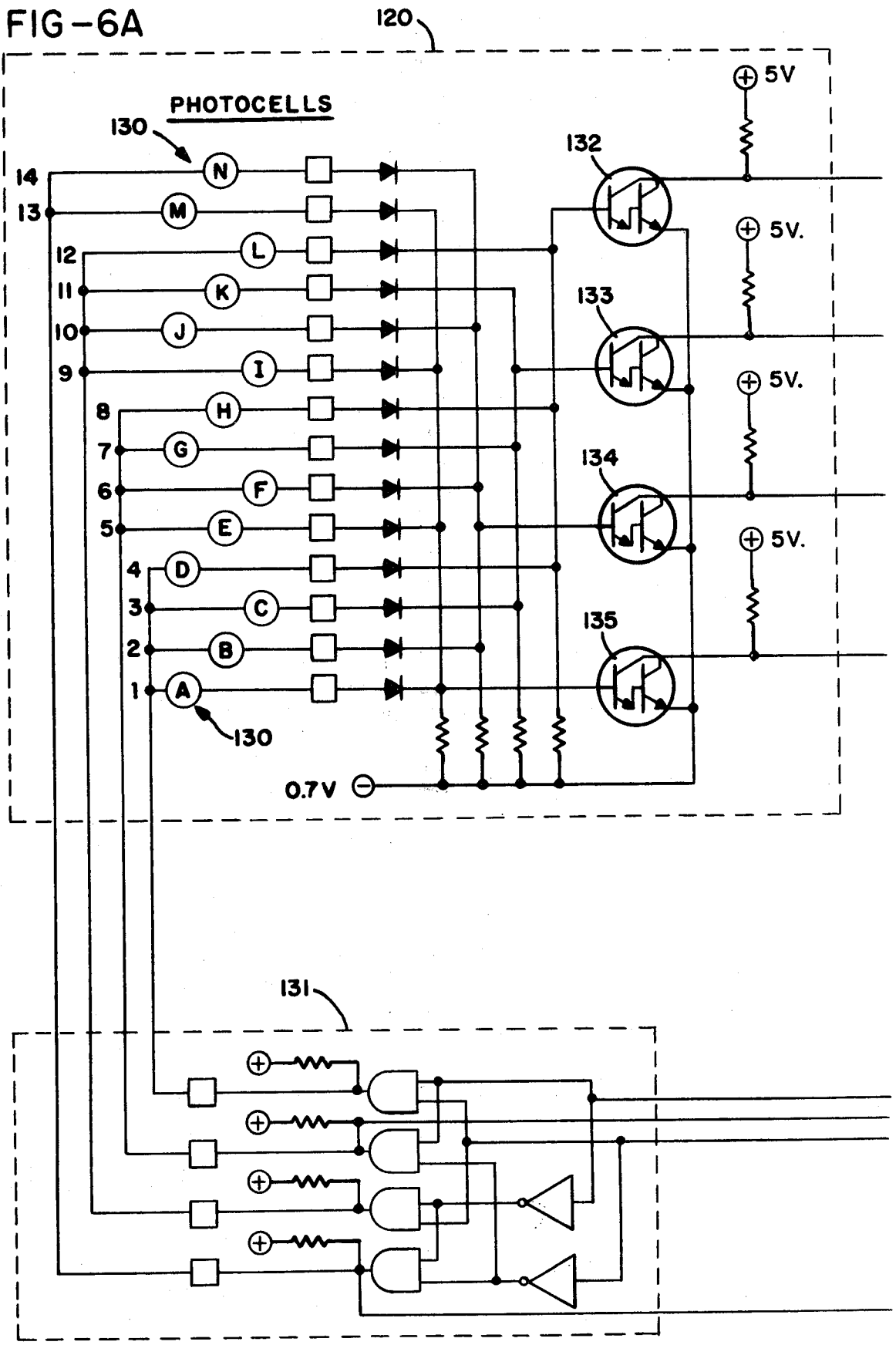

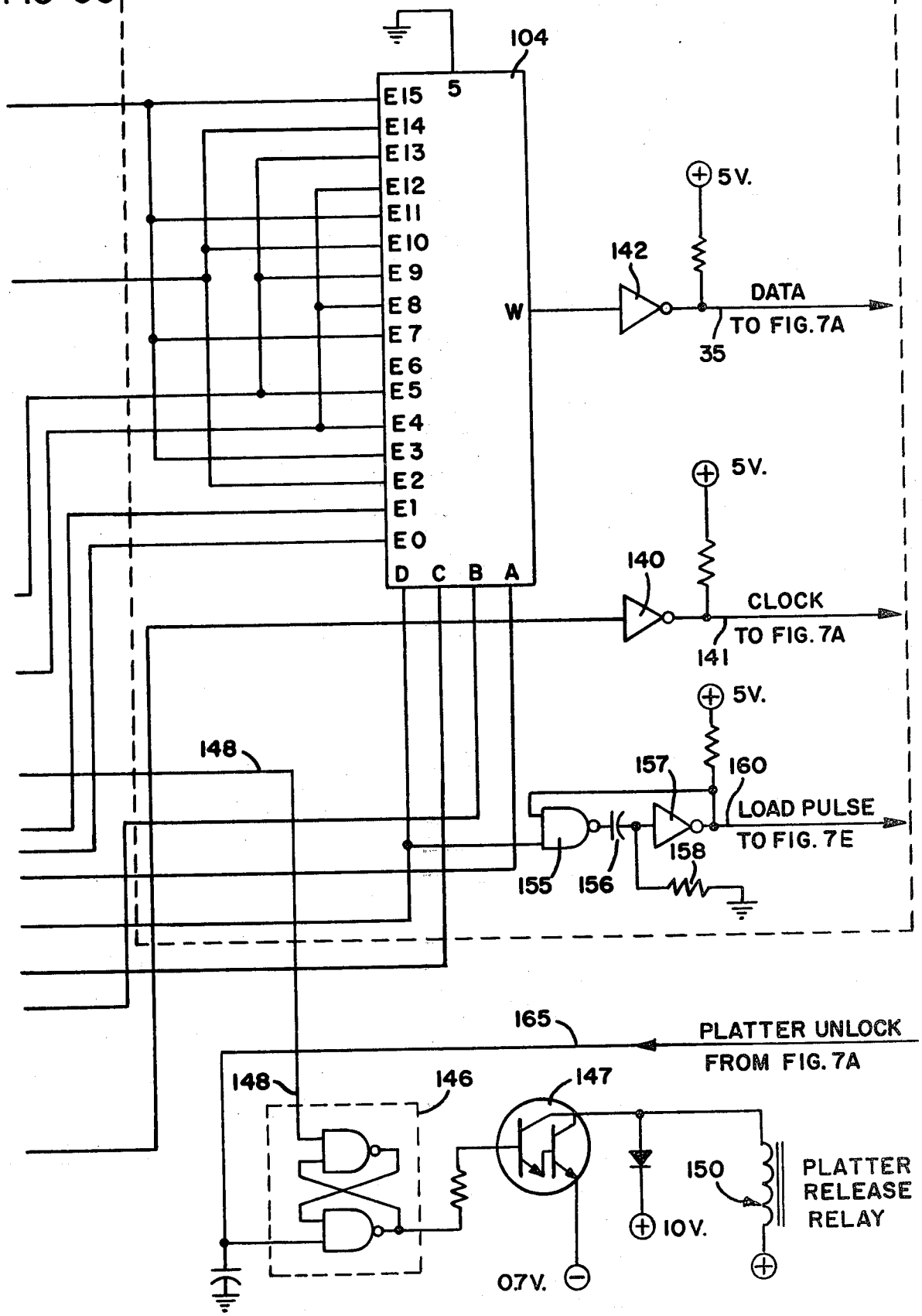

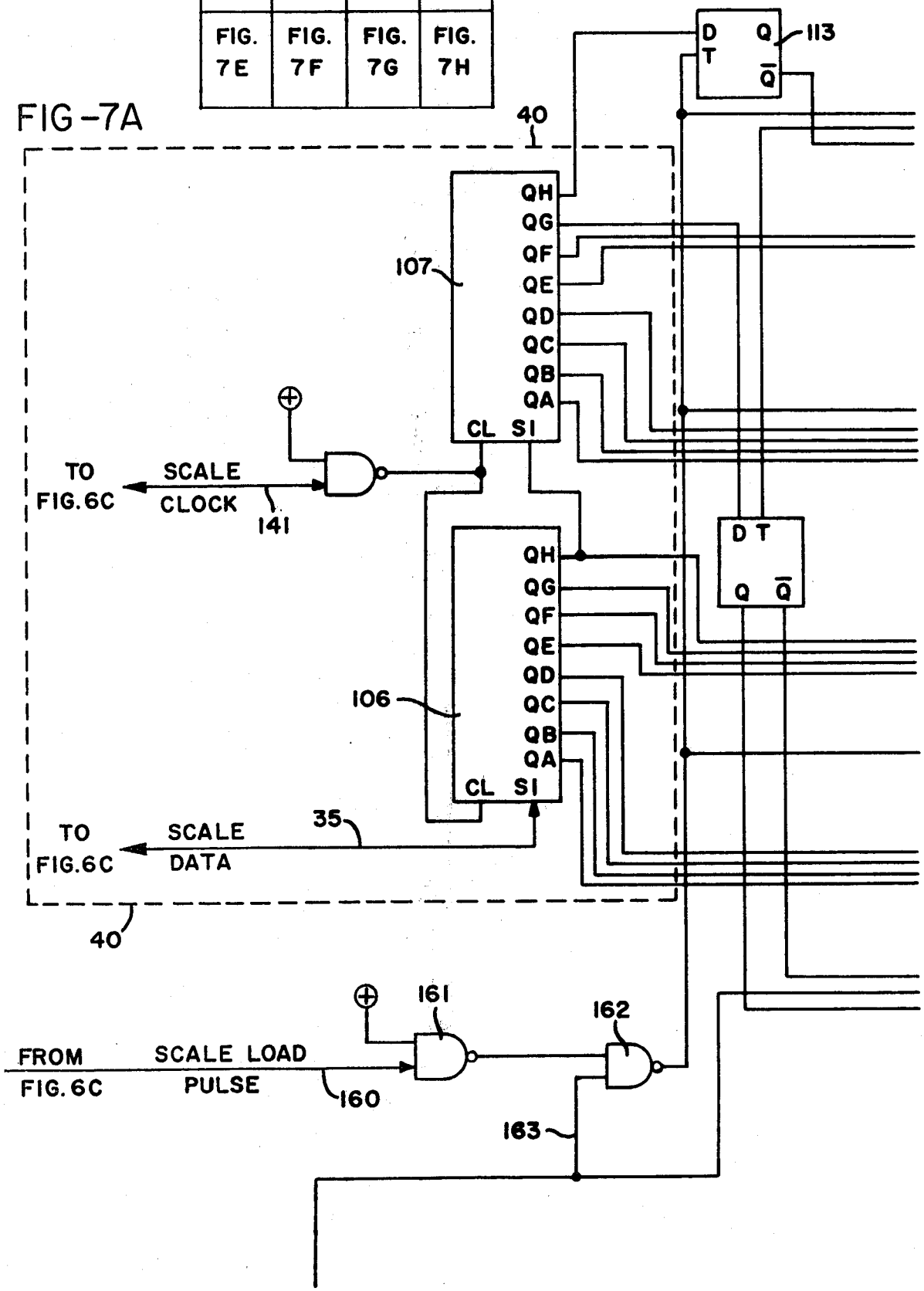

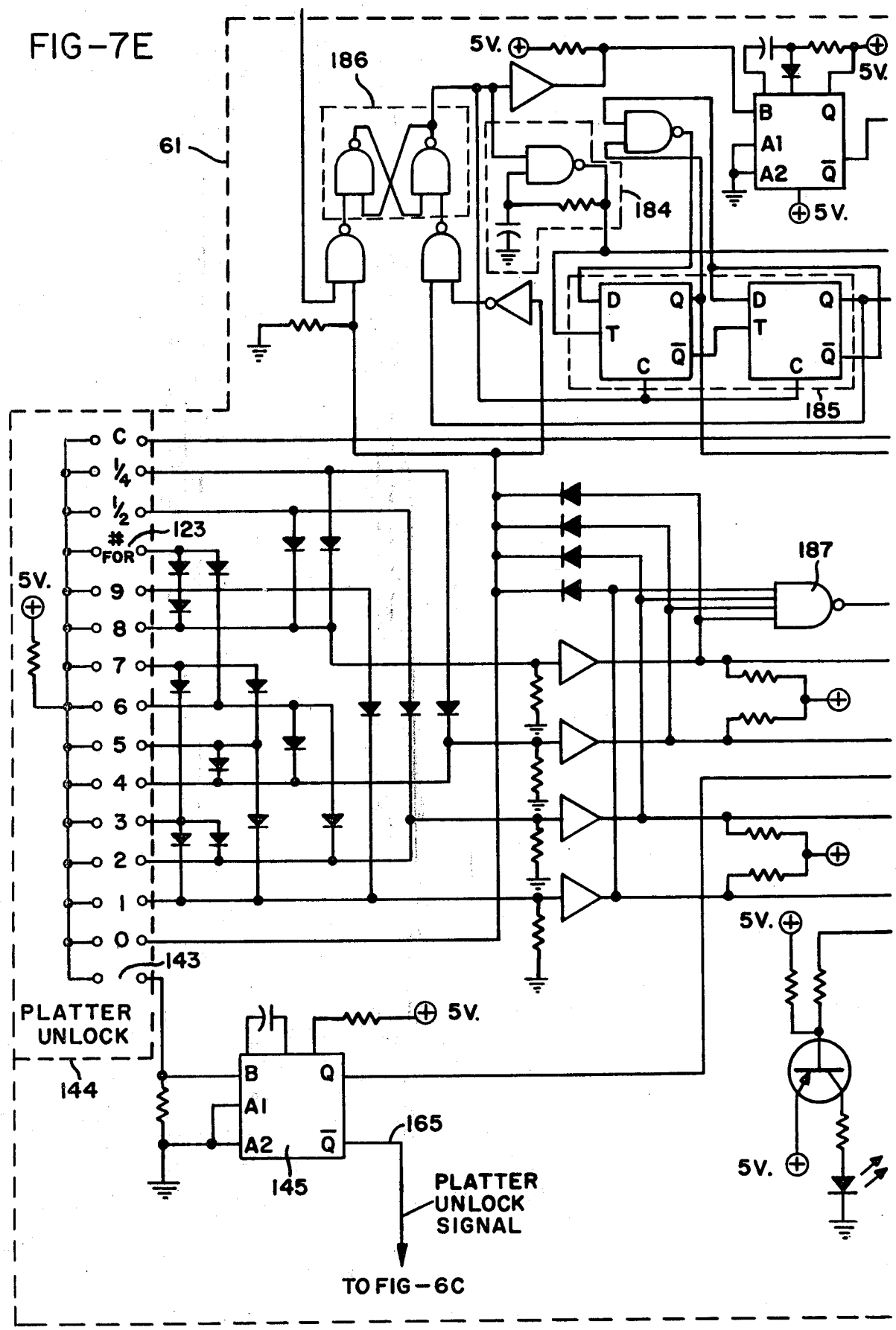

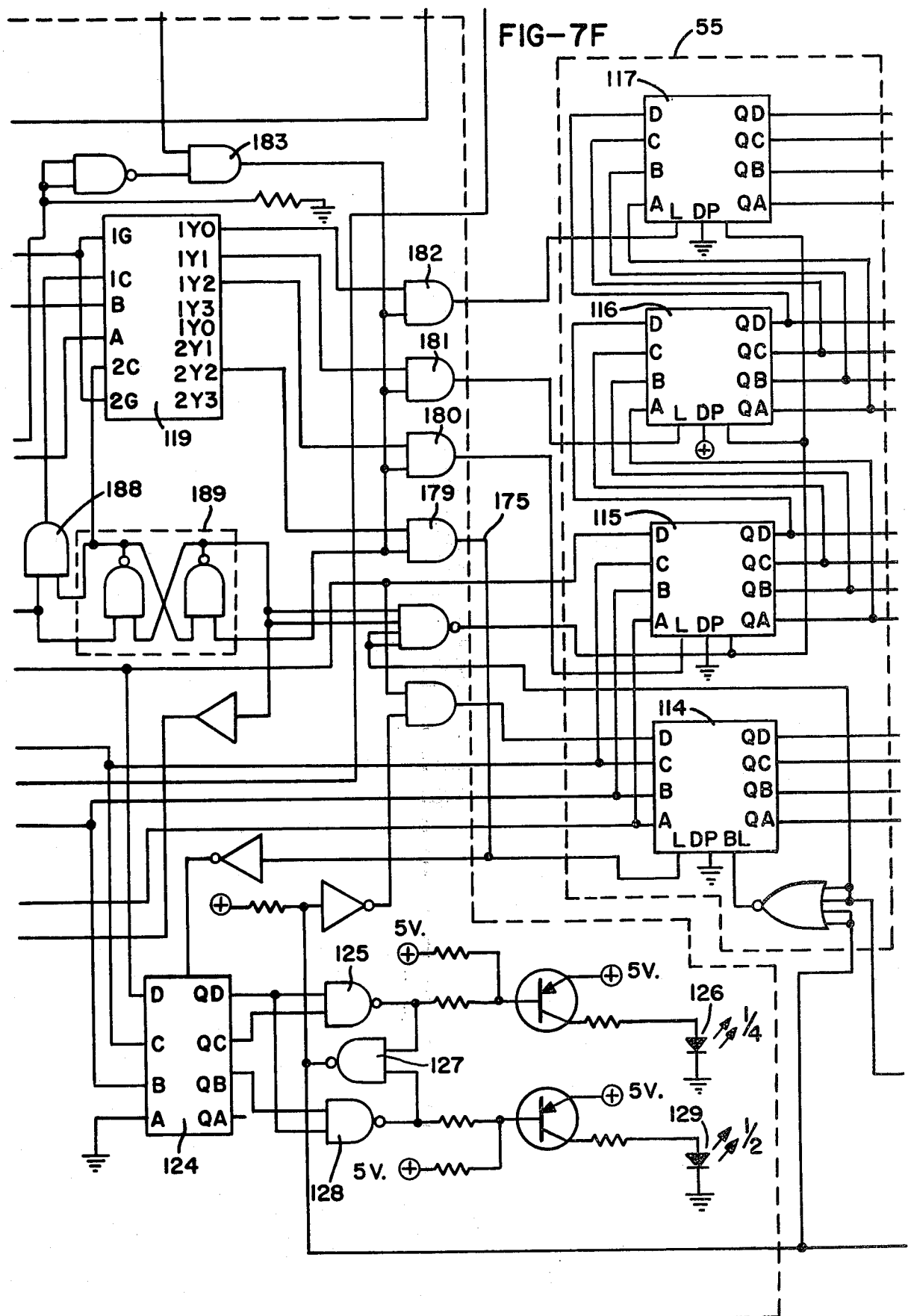

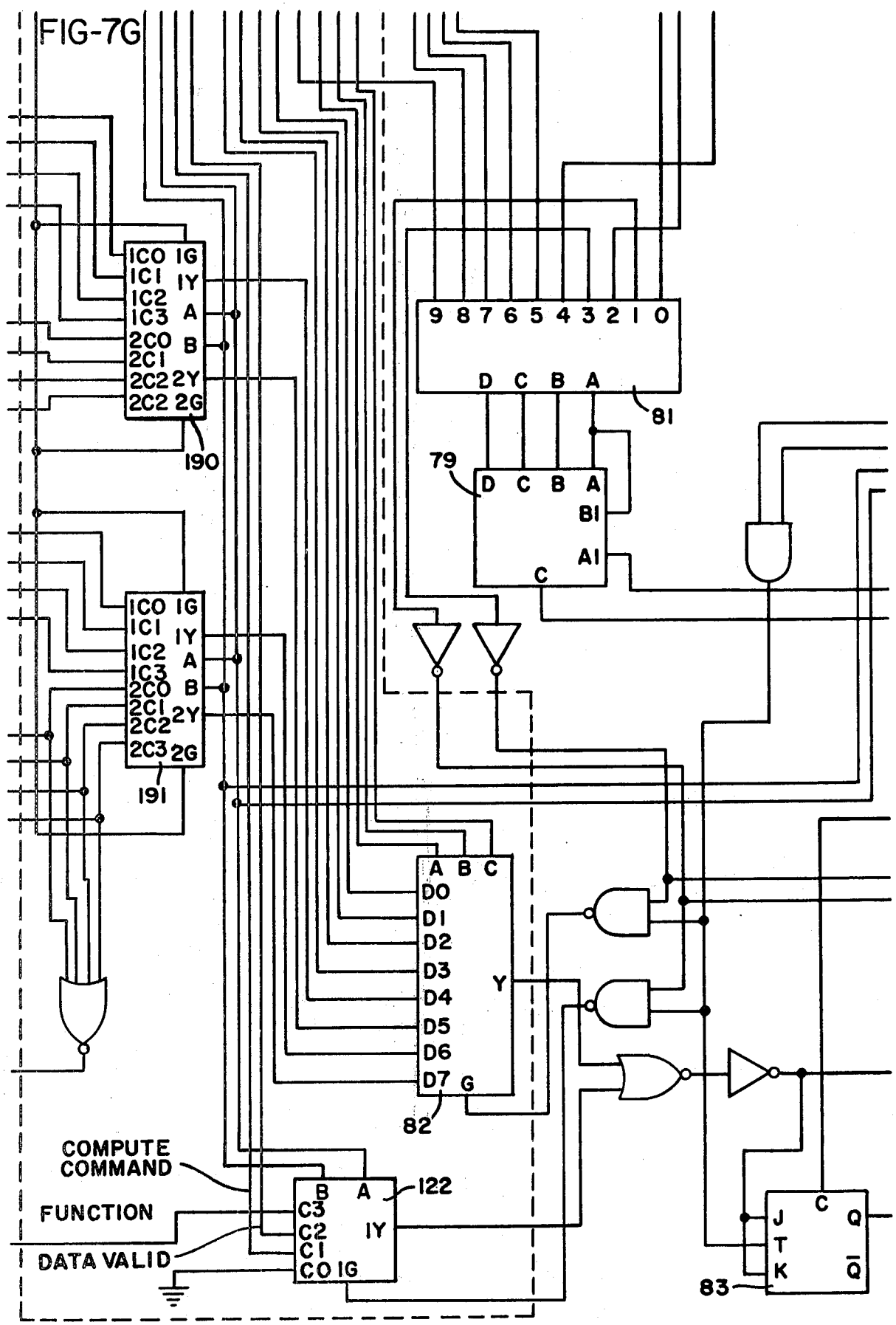

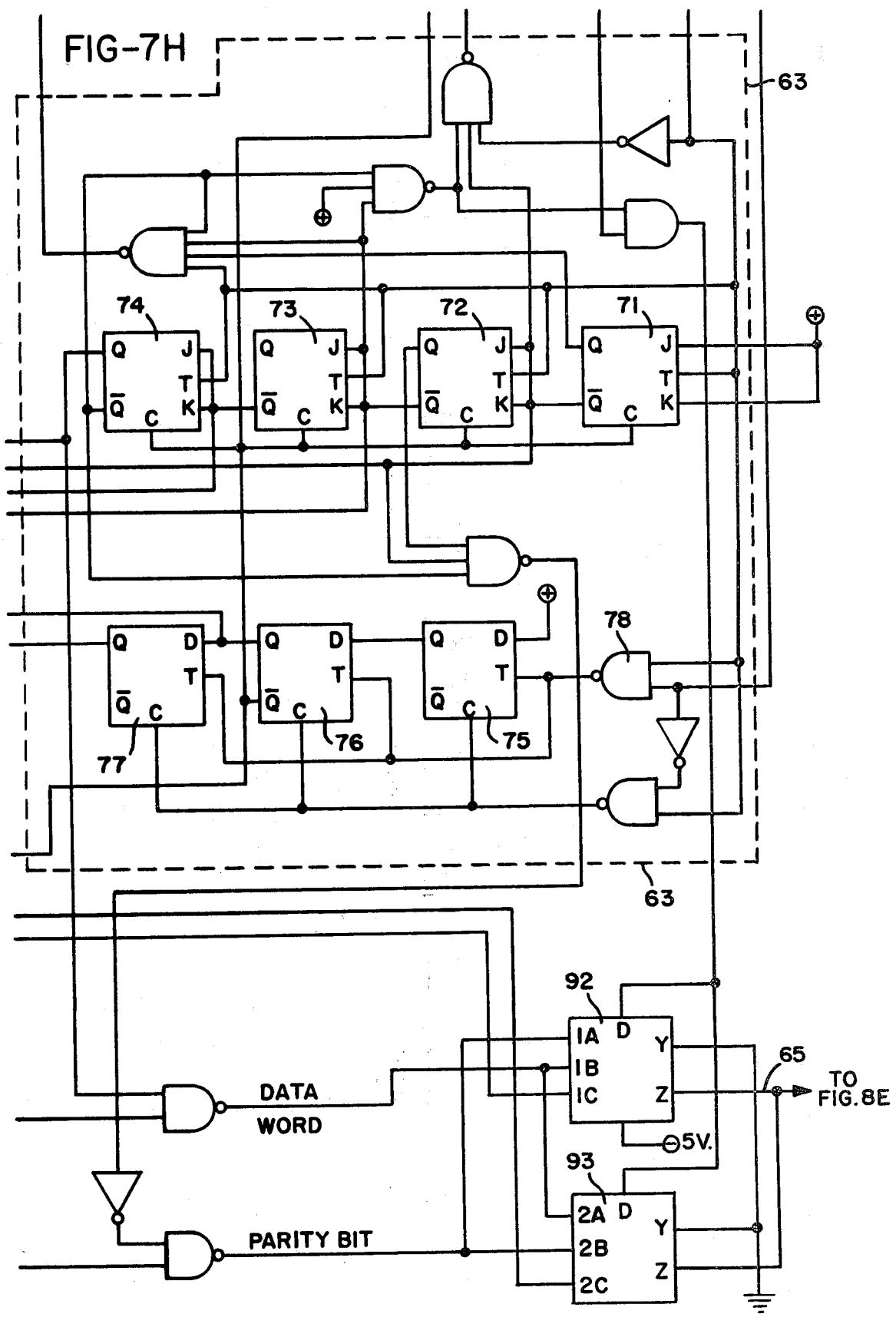

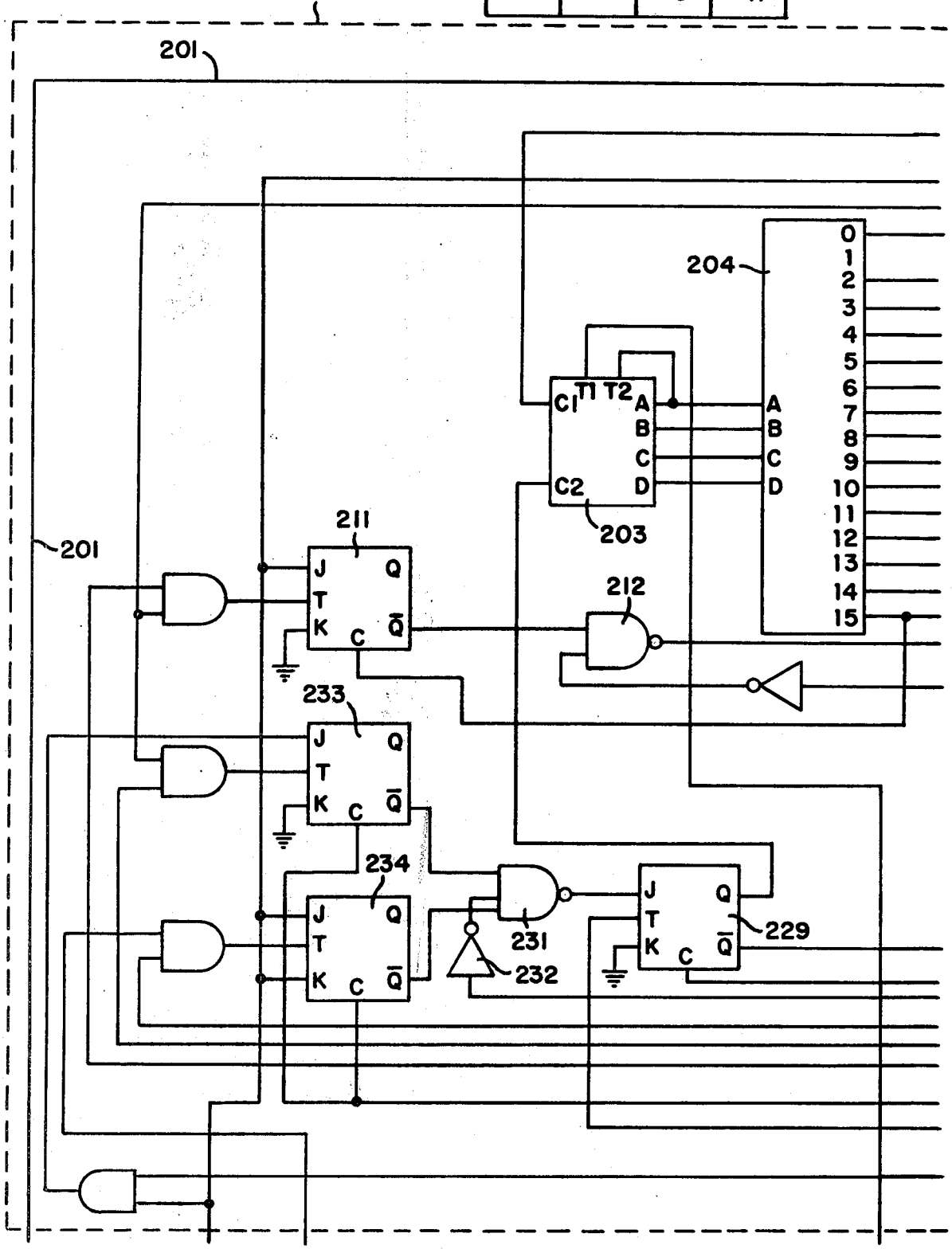

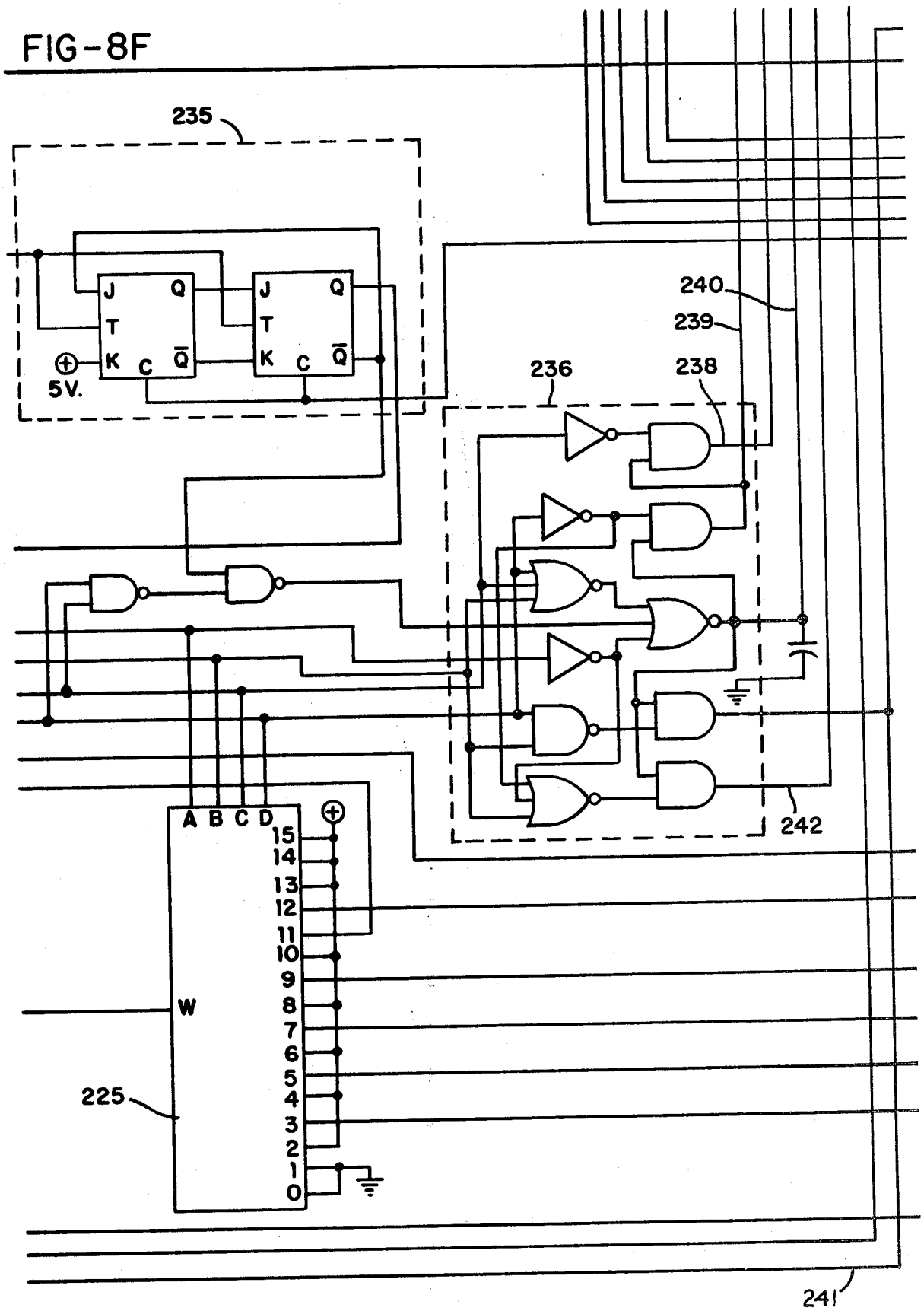

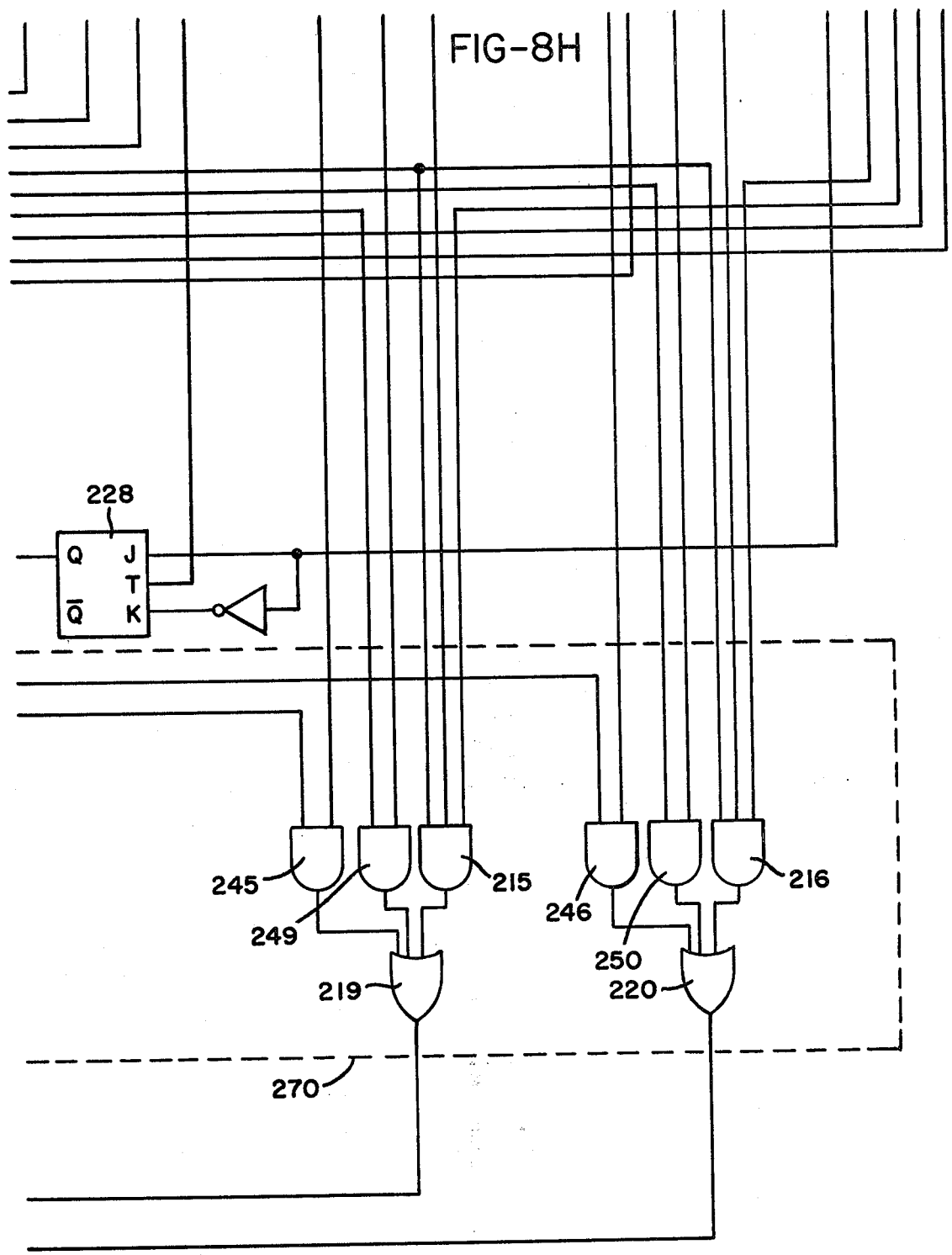

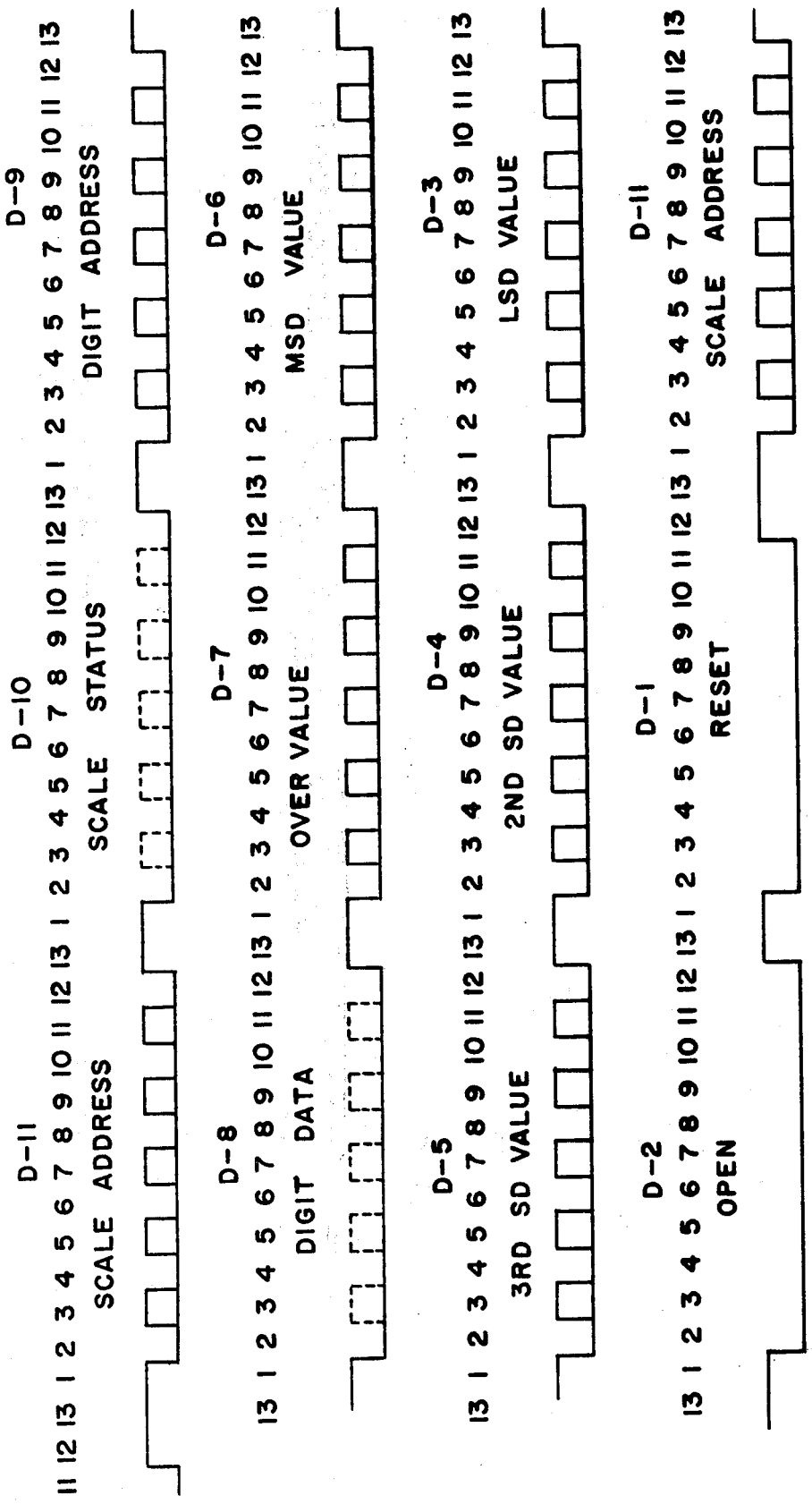

COMPUTING SCALE SYSTEM

CROSS REFERENCE TO RELATED APPLICATIONS

This application is related to U.S. Pat. application Ser. No. 464,766, filed on even date herewith and assigned to the assignee hereof.

BACKGROUND OF THE INVENTION

This invention relates to computing scale systems, and more particularly to computing scale systems of a type suitable for use in point-of-scale merchandising. A typical computing scale system which could be used in point-of-scale merchandising is disclosed in Boshinski et al. U.S. Pat. No. 3,741,324. Such a computing scale system comprises means for weighing an article, a register for storing the weight of said article, keyboard means for entry of a price per unit weight, and means for computing and displaying the value of the article weighed. Such computing scale systems, however, are not well configured for use at supermarket checkout counters, and therefore find primary application at intermediate merchandising points, such as produce counters, wherein a printed label displaying the produce price is affixed thereto.

Recently there has been increasing interest in systems which eliminate intermediate product handling, with most essential merchandising functions being carried out at the point-of-scale. One type of system which is configured for use at a supermarket checkout counter is disclosed in Allen et al. U.S. Pat. No. 2,858,124. This patent discloses a scale having a platter which comprises a portion of a checkout counter and which may be locked out for passage thereacross of items not requiring weighing. This scale, however, is a simple mechanical device, with the total price of a weighed article being indicated on printed charts mounted therein. A more recent point-of-sale scale is the Model 1500 scale sold by The Hobart Manufacturing Company of Troy, Ohio. This scale has a mechanical weight measuring sub-system similar to that disclosed in Allen et al. U.S. Pat. No. 2,858,124, but includes means for converting a measured weight to a BCD code and transmitting the code in bit parallel form to a cash register which may be associated therewith. A plurality of such scales may even be connected to a centralized inventory control computer.

As a general rule, however, most prior art computing scale systems are not well configured for point-of-sale merchandising, and each scale ordinarily has its own computing unit. Such prior art computing scale systems, in addition to those mentioned above typically include systems as shown for instance in Allen et al. U.S. Pat. No. 3,557,353, Fukama U.S. Pat. No. 3,725,656, Bell U.S. Pat. No. 3,291,232 and Susor U.S. Pat. No. 3,459,272.

SUMMARY OF THE INVENTION

This invention provides improved apparatus and method for pricing an article of undetermined weight at a point-of-sale terminal. For this purpose there is a display unit including a keyboard for entry of price per unit weight information, and a scale, preferably provided with platter lock out mechanism, which may form a part of a checkout counter and which is associated with the display unit. Weight information as determined by the scale is transmitted to the scale and displayed together with the price per unit weight information entered by the keyboard. The weight information and the price per unit weight information are both transmitted to a computing unit which computes the value of the article being weighed, and this computed value is transmitted to the display unit for display.

In preferred embodiment the computing unit is housed together with the display unit, but is connected to other display units for servicing each on a time sharing basis. The computing unit accordingly has a display unit address generating network which may be set to generate special addresses for each display unit in communication therewith. Each display unit has a decoding circuit for recognizing its own address, and when this address is recognized, the display unit responds with status information indicating whether or not it requires computation servicing by the computing unit. A positive status response from the display unit causes the computing unit to proceed with a computational program wherein the computing unit repeatedly addresses the display unit and indicates by a series of digit addresses, the data which the computing desires to receive. Each answer by the display unit begins with a new status report and concludes with the requested information.

If the computing unit at any time receives an improper status report from the scale being serviced, then there is a program abort, and servicing of a new display unit begins. This enables usage of the computing unit at high efficiency, but with low probability of a computational error. It also enables serialized communication, which minimizes the number of communication lines required between the computing unit and the display units. Typically all communication between the computing unit and the display units can be carried out with two cables, each comprising a single pair of shielded wires. Preferably all communication between each display unit and its associated scale is also a serial basis, so that again four shielded wires are sufficient.

As discussed in detail below, the display unit keyboard may enter the appropriate weight units as well as the price per unit weight, so that prices may be entered in terms of multiples of a pound or ½ or ¼ lb. When prices are entered in terms of fractions of a pound there is a special code digit included within tne display unit status report, and this code digit causes the computing unit to perform a multiplying step as appropriate to compute the total value of the article being weighed. If this code digit is not transmitted, then the computing unit concludes its value calculation by a division of either 1.0 or other multiple number of pound units which may have been entered by the keyboard.

For merchanizing the complete time sharing scale system there are employed three separate clocks. The first clock, which is relatively slow, is a part of the display unit logic and is used for loading keyboard data into a keyboard data register. The second clock is incorporated within the scale and is used for reading out and storing weight measurements. This second clock is also transmitted from the scale to its associated display unit. The third clock is located within the computing unit and is used for control of an arithmetic processor therein. This third clock is also transmitted to the display for controlling the unloading of data therefrom and the loading of computed price data therein.

Accordingly it is an object of this invention to provide an improved computing scale unit for use in point-of-sale merchandising.

It is another object of this invention to provide an improved display unit for use in combination with a scale unit.

Still another object of this invention is to provide apparatus and method for time shared usage of a computing unit by a plurality of scales.

Other objects and advantages of the invention will be apparent from the following description, the accompanying drawings and the appended claims.

BRIEF DESCRIPTION OF THE DRAWINGS

FIG. 3 is a block diagram of a time shared computing scale system;

FIGS. 6A through 6C are a schematic illustration of the electrical portion of a scale unit;

FIGS. 7A through 7H are a schematic illustration of a display unit;

FIGS. 8A through 8H are a schematic illustration of a computing unit;

FIG. 9 illustrates data signals which may be transmitted between a display unit and a computing unit;

FIG. 10 illustrates an arrangement of FIGS. 8A through 8H for production of a composite computing unit schematic diagram;

FIG. 11 illustrates an arrangement of FIGS. 7A through 7H for production of a composite display unit schematic diagram; and FIG. 12 illustrates an arrangement of FIGS. 6A through 6C for production of a composite scale unit schematic diagram.

DESCRIPTION OF THE PREFERRED EMBODIMENT

Figures 1, 2:
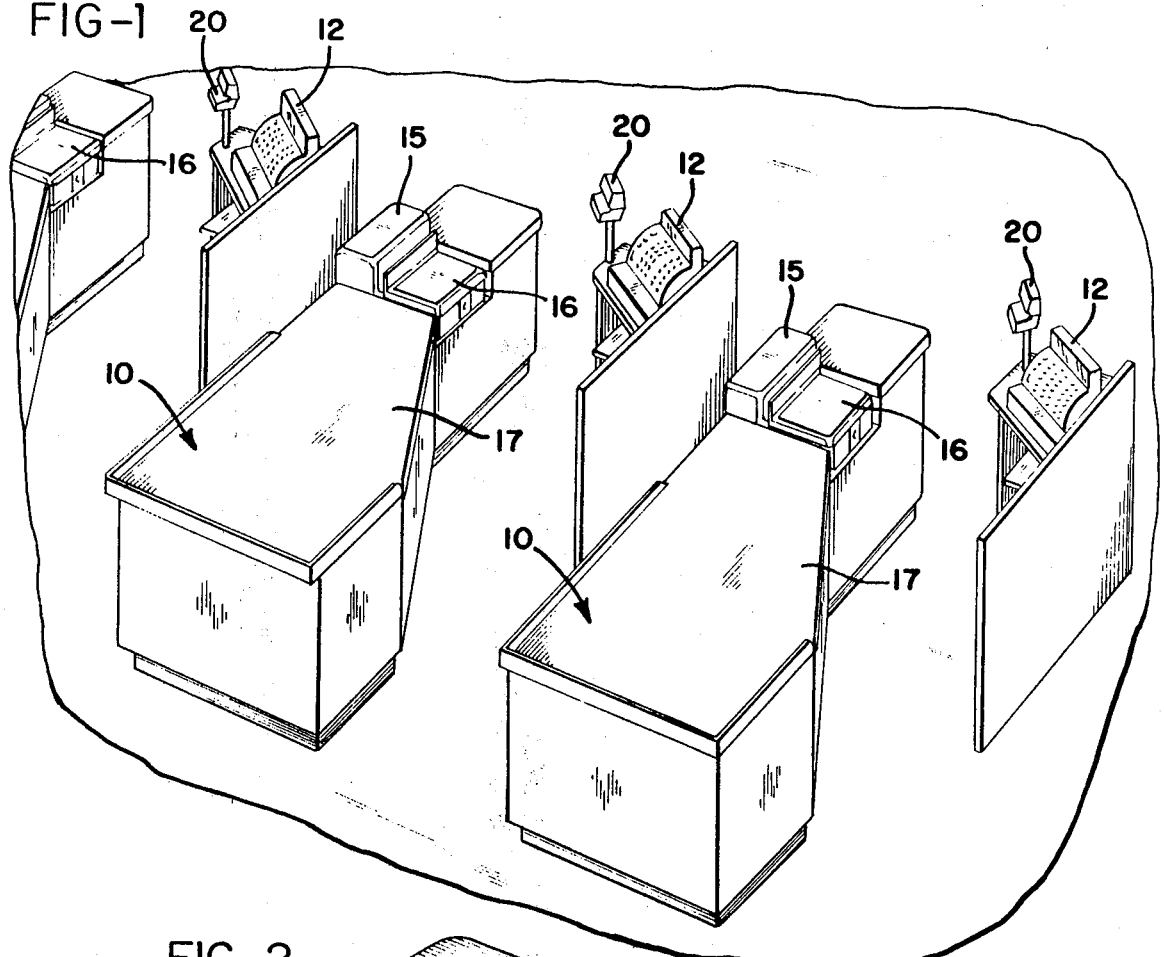
FIG. 1 is a schematic illustration of a checkout counter of a typical supermarket installation employing apparatus according to this invention.
FIG. 2 is a pictorial drawing of a display unit.

Referring now to the drawings which show a preferred embodiment of the invention, and particularly to FIG. 1, a grocery checkout area is shown as including checkout counters 10, cash registers 12 and scales 15. Preferably, the scales are mounted in the ckeckout counter 10 with the top surface of the platter 16 generally flush with the counter surface 17. A display unit 20 is associated with each checkout counter and may be mounted adjacent the cash register, as shown in FIG. 1, for viewing by both the clerk and the customer.

The display unit 20 is shown in greater detail in FIG. 2 and includes a keyboard 22 used by the clerk to enter the price per unit weight of the commodity being purchased as well as a fractional number, if desired. The keyboard unit also includes four function keys, shown generally at 23.

One of the display units 20 contains a computing section to multiply the price per unit weight by the weight of the object on the scale platter, and to cause this information to be displayed visually. This same display unit is connected to serve a plurality of checkout stations on a time sharing basis. All of the display units displays price per unit weight information on an electro-optic display 26. The weight information is displayed on a display 27; and the computed price information is displayed on a display 28. Wiring between the computing section and the display units 20 is kept to a minimum by converting all transmitted information into binary coded decimal (BCD) form and sending the information between units in a serial manner.

The transmitted information includes status, weight, and price per unit weight information from the display units to the computing section, and address, computed value and clock information from the computing section to the display units. As described in detail below, the computing section services the display units on a sequential basis. Each time a new display unit is addressed, the computing section commences a two-way communication and begins cycling through a 16 step program leading toward computation of the computed value of merchandise being weighed. Each step of the program commences with a display unit address to which the address display unit replies with status information. If at any time the computing unit obtains an improper status reply, the computing program is aborted and a new display unit is addressed.

Motion of the scale platter is sensed by observing the direction of change in the weight temporarily stored in an input register. A difference in weight indicates motion, and two successive changes in the same direction will cause a motion signal to be generated. This motion signal is transmitted as status information to the computing unit which in turn aborts the program as mentioned above.

Referring now to FIG. 3, which is a simplified block diagram of the system, a scale 15 includes weighing mechanism 18 equipped with an optical chart (not shown) which is moved in accordance with the weight of the object placed on scale platter 16. The weight information is read out from the optical chart in a binary-cyclic-biquinary code and is converted into a BCD form by scale logic 19. Upon appropriate command signals from the scale logic, this information is periodically transferred on line 35 to an input register 40 in the display unit 20. This weight information is subsequently transferred to a memory 45 and displayed on the electro-optic display 27.

A motion detector 50 senses when the scale platter is in motion, and if motion is indicated, the price computation and the total price display 28 are inhibited. The price per unit weight information from the keyboard 22 is stored in a memory 55 and displayed on the electro-optic display device 26. Information for display by the computed price display 28 is stored in a memory 58. However, as described below with reference to FIGS. 7A through 7H, each of displays 26 through 28 may be integrated physically with its associated memory.

A computing unit 60, which may be housed within one of the display units 20, comprises a logic interface 69 for communicating with all of display units 20 and computing logic 68 for performing required computations. Output from computing unit 60 is provided to logic circuits 62 of display units 20 by a line 66 and input data for computing unit 60 is supplied by display units 20 via another line 65.

Figure 5:
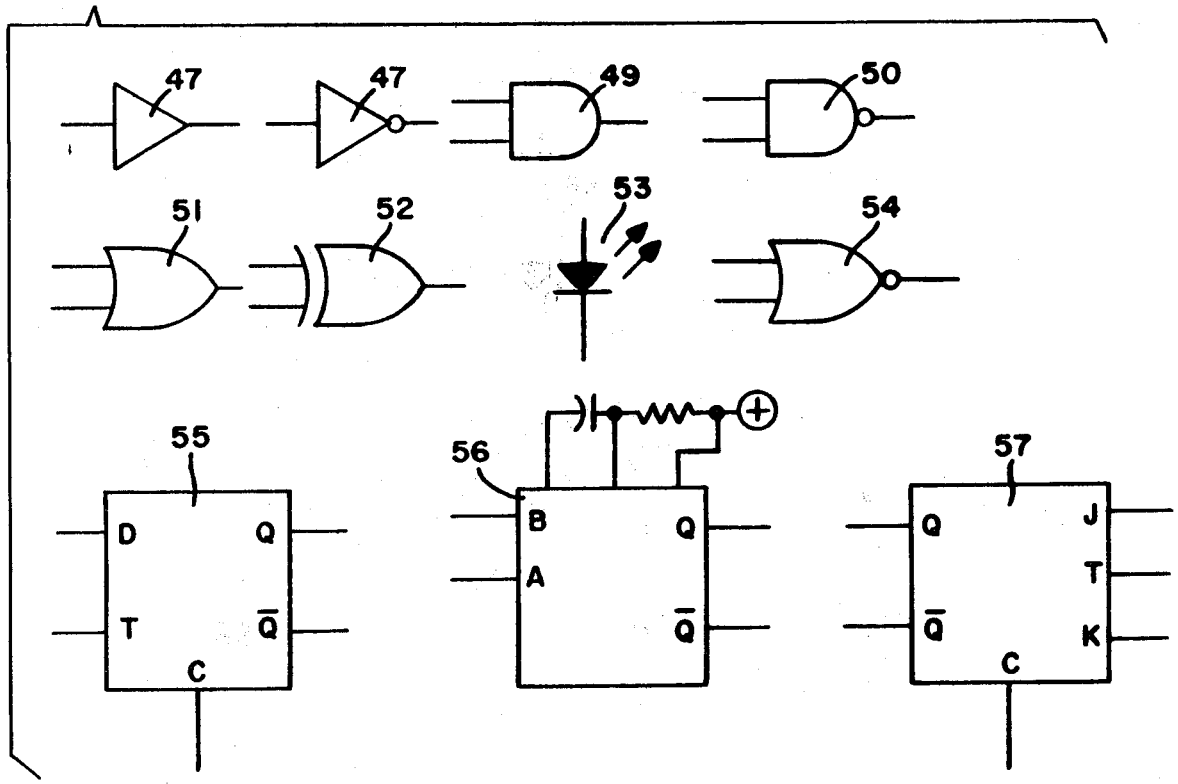
FIG. 5 illustrates symbols having a standard meaning throughout FIGS. 6 through 8.

The logic of the scale unit, the display unit, and the computing unit are described in detail below with reference to FIGS. 6A through 6C, 7A through 7H, and 8A through 8H respectively. FIG. 5 illustrates certain symbols which are used throughout the other aforementioned figures. Referring now to FIG. 5, it will be understood that the symbol denoted by the reference number 47 is an amplifier. An inverting amplifier is as denoted by 48, an AND gate by 49, a NAND gate by 50 and an OR gate by 51. The numeral 52 denotes an exclusive OR gate, 53 a light emitting diode, and 54 a NOR gate. The symbol denoted by 55 is a D type edge triggered flip-flop with a clear, and 57 is a J-K master-slave flip-flop. A special type of retriggerable monostable multivibrator as denoted by 56 may be connected externally to a capacitor, resistor and potential source as shown. Such a device, less external components, may be purchased as an integrated circuit from Texas Instruments of Dallas, Texas under the designation SN74123. A triggering input to this circuit causes the Q output terminal to produce a positive going pulse of a length as determined by the values of the external capacitor and resistor. Triggering is produced by a positive going pulse edge at the B input terminal with a LO at the A terminal, or by a negative going pulse edge at the A terminal with a HI at the B terminal. The $\overline{Q}$ output is the inverse of the Q output.

Figure 6B:
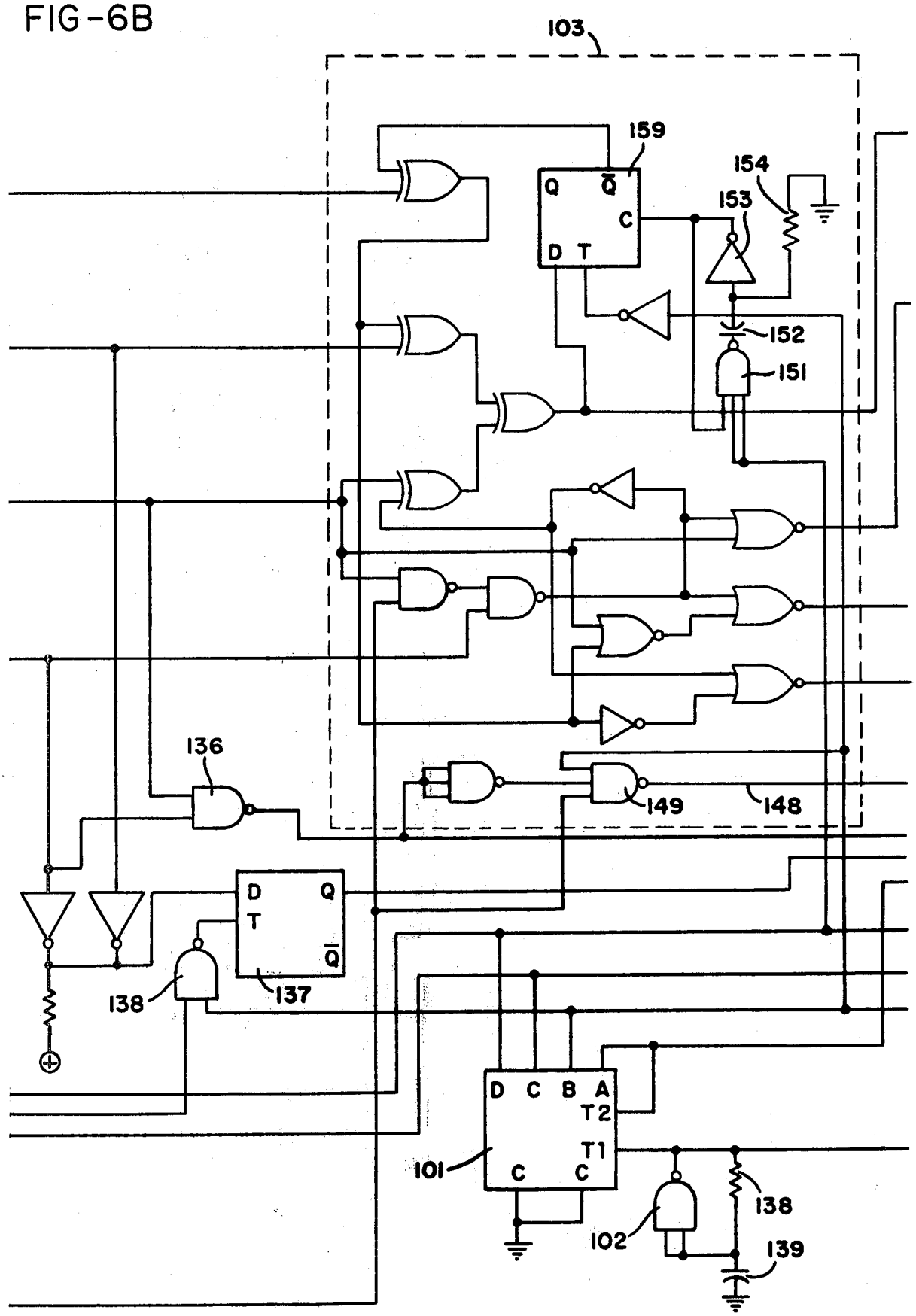
Figure 7B:
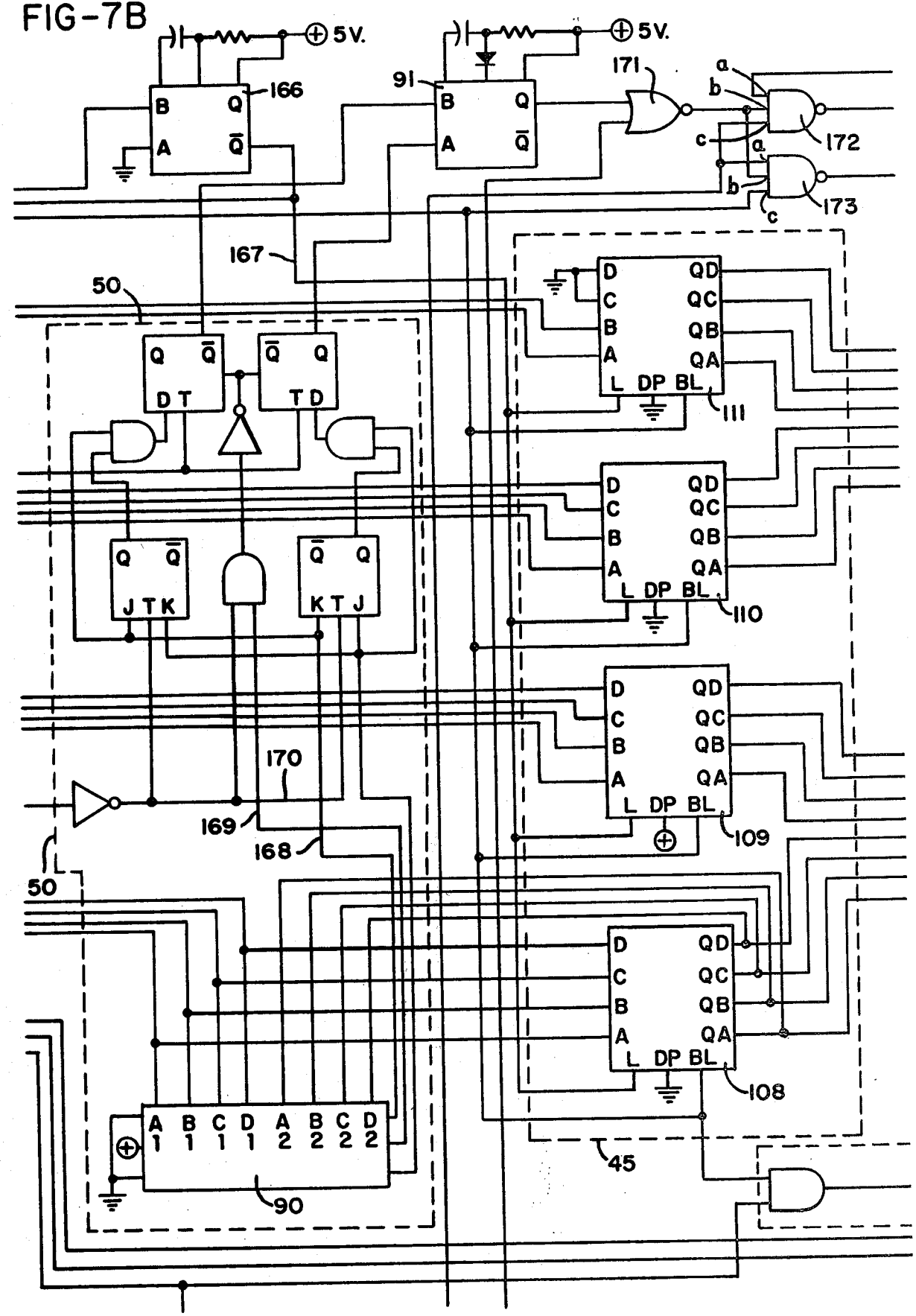
Figure 7C:
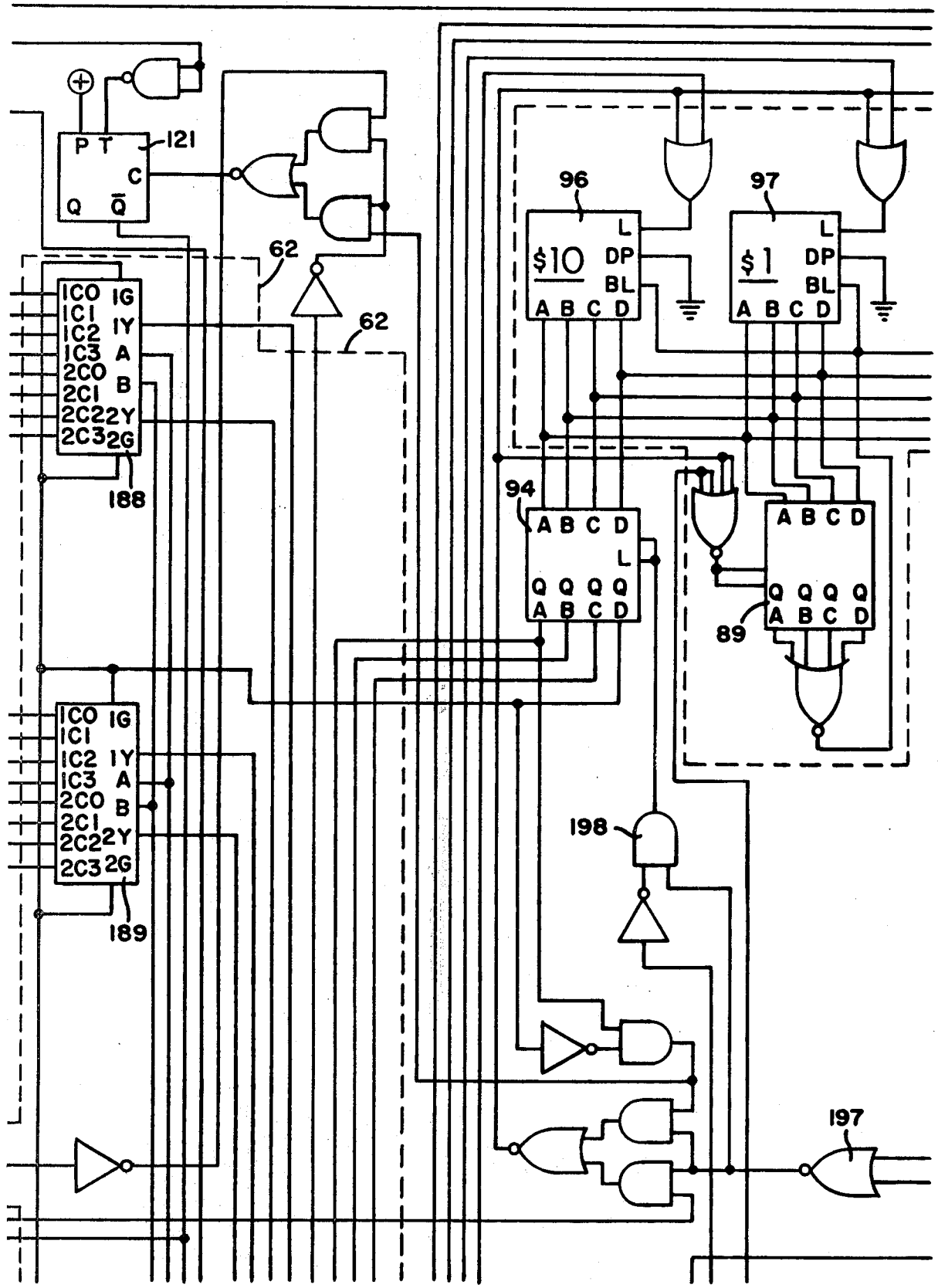
Figure 7D:
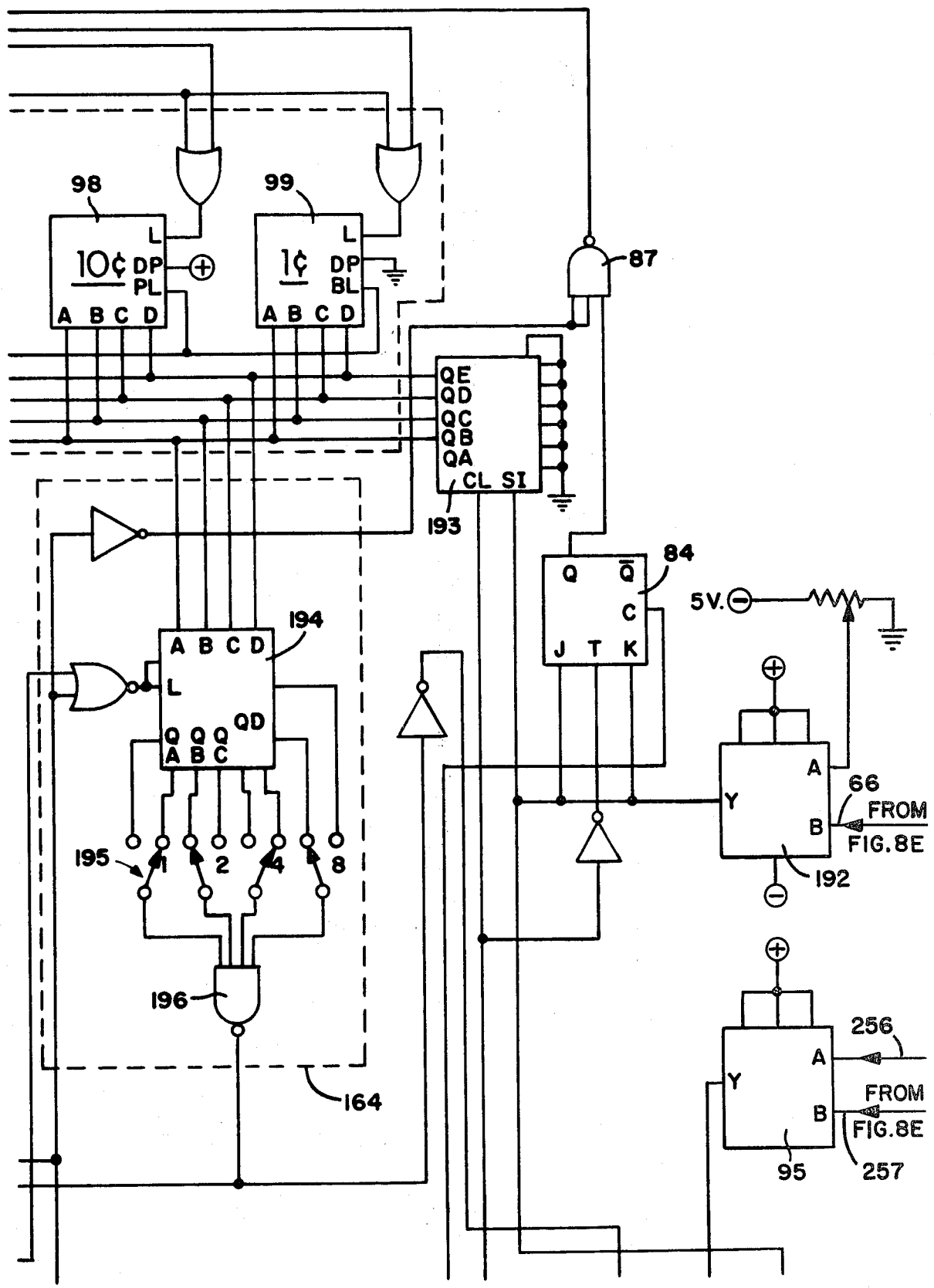

Referring to FIGS. 6A through 6C there is shown a photocell unit 120 which comprises a series of photocells 130. Photocells 130 are selectively illuminated by movement of an optical chart (now shown), the movement of which is in accordance with the weight of an object placed on scale platter 16. This optical chart and the means for optically reading weight information are described in U.S. Pat. Nos. 3,439,760 and 3,557,353. Photocells 130 are driven by an arrangement of cell drivers 131, and the photocell output signals are applied to a set of preamplifiers 132 through 135. The input to preamplifiers 132 through 153 is a weight representation expressed in a binary-cyclic-biquinary code. This code is amplified and inverted by preamplifiers 132 through 135 and applied to a code converter 103. Code converter 103 converts the biquinary code into a binary coded decimal (BCD) code for application to input terminals E2 through E15 of a multiplexer 104. The maximum weight which can be read by the scale system is 29.99 lbs., and the binary data applied to input terminals E2 and E3 of multiplexer 104 represents the most significant weight digit which may be 0, 1 or 2. The binary input to terminals E4 through E7 represent the most next significant weight data and so on to input terminals E12 through E15.

A HI input to terminal E1 of multiplexer 104 indicates that the measured weight is greater than 0.02 lbs., and a HI signal to input terminal E0 indicates that the weight applied to the scale platter is beyond the scale range. The input for terminal E1 is derived from a NAND gate 136, which has its input terminals connected to receive output signals from preamplifiers 135 and 134. A LO output from NAND gate 136 means that photocell M and N are both non illuminated. As disclosed in U.S. Pat. No. 3,557,353, this condition indicates that the scale is measuring a weight less than a predetermined minimum weight, which in this case is taken to be a 0.02 lbs. As further discussed in U.S. Pat. No. 3,557,353 photocells G and E are extended below 0 and above the maximum range, so that illumination of both of these photocells indicates an out-of-range condition. Such an out-of-range condition will produce a LO output from photocells 133 and 135, which in turn will produce a HI input for terminal D of flip-flop 137. Flip-flop 137 is triggered on the positive going edge of clock pulses received from NAND gate 138, and NAND gate 138 is enabled by the B output terminal of a binary four-bit counter 101. Thus counting outputs from counter 101 produce a HI input for terminal E0 of multiplexer 104 if and only if photocells G and E are illuminated at that time. Clock pulses for counter 101 are supplied by a free-running Schmitt arrangement comprising a NAND gate 102, resistor 138 and capacitor 139. The four output terminals from counters 101 are connected to input terminals A through D of multiplexer 104 to control a serial output therefrom at terminal W.

The clock signal applied to terminal T1 of counter 101 is also applied via inverting amplifier 140 and a line 141 for transmission to the associated display unit 20. Serial output signals from terminals W of multiplexer 104 are applied via inverting amplifiers 132 and line 135 to the same display unit.

The scale employed in connection with this invention preferably employs a platter lockout arrangement, so that merchandise may be slid across the platter without actuating the scale. The platter is constructed for normally inhibited movement and to be freely moving only during actuation of an associated platter release relay. A detailed description of a suitable mechanical arrangement for a somewhat similar platter control is set forth in Allen et al. U.S. Pat. No. 2,858,124.

As employed in connection with this invention, the platter is released by closing platter unlock key 143 on keyboard terminal 144 within display unit 20 (see FIG. 7E). This key must be closed while weight is resting on the scale, and this causes a platter unlock signal to be transmitted to the associated scale unit 15 via line 165 from the $\overline{Q}$ terminal of a monostable multivibrator 145. Multivibrator 145 may be a circuit SN74121 (manufactured by Texas Instruments) connected as shown. The platter unlock signal is a single negative going pulse which is applied to a NAND gate latching circuit 146 arranged as illustrated. The output of latching circuit 146 is applied to the base of amplifier 147, and the latching circuit output is normally latched LO.

Latching circuit 146 has a first input line 165 which carries platter unlock signals and a second input line 148 which is connected to the output of a NAND gate 149. When the weight on platter 16 is less than 0.02 lbs., then a series of negative going pulses appear on line 148. Line 165 is normally HI, so that the output from latching circuit 146 goes LO upon appearance of LO pulses on input line 148. The output from latching circuit remains latched in this LO condition when input line 148 returns HI. When weight is placed on the platter, then line 148 maintains a steady state HI condition.

When the clerk closes the platter unlock key and generates a LO pulse on line 165 as above described, then the output from latching circuit 146 goes HI thereby energizing relay 150 and enabling weighing movement of the platter. Relay 150 continues to remain energized after line 165 returns to the normal HI condition, but only so long as the weight on the platter remains above 0.02 lbs. As soon as the weight is removed from the platter, the output from latching circuit 146 again is latched LO, relay 150 is deenergized, and platter 16 serves merely as a section of the checkout counter. If the platter release key is closed with no weight on the scale, then the output from latching circuit 148 will go HI and stay HI only during occurrence of the LO platter release pulse on line 144. Thereafter the first regularly recurring LO pulse on line 148 will flip the output of circuit 148 into a LO, relay deenergizing condition. Circuit 148 will then become latched in this LO output condition, so it may be seen that the platter unlock key must be closed with the platter weighed down.

The only remaining elements on FIGS. 6A through 6C which require special comment are a pair of pulse forming circuits, one of which comprises a NAND gate 151, a capacitor 152, an inverting amplifier 153 and a resistor 154 and the other of which comprises a NAND gate 155, a capacitor 156, an inverting amplifier 157, and a resistor 158. The first of this pulse forming circuits creates sharp pulses for clearing flip-flop 159, which forms a part of the code converter 103. The other pulse forming circuit creates load pulses for transmission via line 160 to the associated display unit 20.

Referring now to FIGS. 7A through 7H, which are arranged as shown by FIG. 10, it will be seen that scale data information on line 35 is applied serially to a shift register 106 having eight output terminals QA through QH. Output terminal QH of shift register 106 is connected to input terminal SI of another shift register 107. The scale clock signal on line 141 is applied to the clock terminals of shift registers 106 and 107, so that 16 bits of information on line 35 are clocked into shift register 106, with the first eight bits thereof being shifted also into shift register 107. As a result, the "out-of-range" data stored in scale unit 15 at the E0 portion of multiplexer 104 ends up as an output at terminal QH of shift register 107. If the weight on platter 16 is less than 0.02 lbs., then the resulting zero which is provided at input terminal E1 of multiplexer 104 becomes stored at position QG of shift register 107. The data stored at positions QF and QE of shift register 107 represents the most significant digit of weight information, and the remaining twelve storage locations of registers 107 and 106 contain binary representations of the three next significant weight digits in decreasing order of significance.

Negative going load pulses which are transmitted from the scale logic to the display logic along line 160 are transmitted via a NAND gate 161 to another NAND 162. Line 160 is normally HI so that the output from NAND gate 161 is normally LO. NAND gate 162 receives this normally LO signal from NAND gate 161 and produces a HI input of the trigger terminal of flip-flop 113 and the B input terminal of multivibrator 166. When a LO load pulse is received by NAND gate 161 on line 160 the output thereof goes HI. If at the same time a HI appears on input line 163 of NAND gate 162, then the trigger input of flip-flop 113 goes LO. Such a HI on line 163 indicates generation of a compute command by compute command flip-flop 121.

The LO going output from NAND gate 162 triggers flip-flop 113 to provide a $\overline{Q}$ output which is the inverse of the data loaded in the QH position of register 107 and also causes multivibrator 166 to generate a LO going strobe at its output terminal $\overline{Q}$. This strobe is applied via line 167 to load terminals L of registers 108 through 111. Registers 108 through 111 may be circuit types TIL 309 sold by Texas Instruments. These circuits are equipped with code logic and numeric displays so as to provide a visual decimal display of binary data stored therein.

When a strobe appears on line 167, a weight memory 45 comprising registers 108 through 111 is added with the weight information stored in shift registers 106 and 107. Register 111 stores and displays the most significant digit of weight information (which as above described cannot be greater than 2), register 110 stores and displays the next most significant digit of weight information, and so on down to register 108 which stores and displays the least digit of weight information. Register 108 cooperates with register 106 and motion sensing circuit 50 to provide a scale motion indication.

So long as line 167 remains HI, registers 108 through 111 ignore data changes at their input terminals A through D. Thus while shift registers 106 and 107 are being loaded with new weight data, registers 108 through 111 continue to display the previously loaded information. Thus there may be a difference between the data on the input and output terminals of register 108 and this difference represents the change in the least significant digit of weight information as measured during two successive observations. Accordingly motion detecting circuit 50 has a coincidence detecting circuit 90 which has a first set of input terminals A1 through D1 and a second set of input terminals A2 through D2. This circuit may be a circuit type SN 7485 sold by Texas Instruments. Input terminals A1 through D1 of circuit 90 ar connected to input terminals A through D of register 108, and input terminals A2 through D2 of circuit 90 are connected to output terminals QA through QD of register 108. Circuit 90 has three output terminals which are connected respectively to lines 168, 169 and 170, and these lines in turn are connected to a direction sensing element within circuit 50 as illustrated. The logic levels appearing on lines 168 through 170 indicate whether the least significant digit of weight information stored in shift register 106 is greater than, equal to, or less than the previously stored digit as appearing at the output terminals QA through QD of register 108. A difference in this digit indicates scale motion, and two successive changes in the same direction will cause motion sensing circuit 50 to generate a motion signal as described in detail in copending patent application Docket 5801 filed on even date herewith and assigned to the assignee hereof.

When motion sensor 50 detects scale motion, then it triggers multivibrator 91 to generate a HI output at the Q output terminal thereof for a period of one second. As will be understood from the description below, this HI output from multivibrator 91 inhibits computation by the computing unit and blanks display 28 until at least one second after an "equal to" indication is detected and maintained.

When scale motion is detected, the HI output from terminal Q of multivibrator 91 is applied to one input terminal of a NOR gate 171. NOR gate 171 has a second input from the Q output terminal of multivibrator 145, which is normally LO and goes HI only during generation of a platter unlock signal as aforesaid. A scale motion signal therefore appears as a LO output from NOR gate 171, and this LO output is applied to terminal B of NAND gates 172 and 173. The output terminals of NAND gates 172 and 173 are connected respectively to a flip-flop 121 and a multiplexer 122 (which is part of a multiplexing network 62). Multiplexer 122 provides display unit status information to computing unit 60 as described below, and flip-flop 121 supplies a compute command signal to input terminal C1 of multiplexer 122. A LO input to any of the input terminals of NAND gates 172 or 173 produces a HI output therefrom, and this HI output in turn will load multiplexer 122 with a data bit which, upon transmission to computing unit 60, will cause a program abort. In addition to the scale motion input to input terminal b of NAND gates 172 and 173, there is a keyboard change input to terminal c of NAND gate 172 and terminal a of NAND gate 173. Terminal a of NAND gate 172 is connected to receive a parity error signal from a NAND gate 87, and terminal c of NAND gate 173 is connected to the $\overline{Q}$ output of a flip-flop 113. The D input of flip-flop 113 is connected to terminal QH of shift register 107 which, as above mentioned, is loaded with a "one" if the scale is out-of-range. Thus scale motion, a keyboard change, or an out-of-range scale condition will cause a HI output from a NAND gate 173, and this HI output will load a "data invalid" data bit into input terminal C2 of multiplexer 122 for transmission to the computing unit. Further a paritiy error, scale motion, or a keyboard change will cause a HI output from NAND gate 172 and trigger a LO output from the Q terminal of flip-flop 121. This LO output from flip-flop 121 prevents loading of a compute command bit into terminal C1 of multiplexer 122 as well as inhibiting a LO data-shift-producing output from NAND gate 162.

Still referring to FIGS. 7A through 7H, keyboard 144 comprises a series of 15 contacts which communicate through a logic network 61 with keyboard memory 55. Contacts 15 are selectively closed in a predetermined sequence by depressing keys 22 and 23 of display unit 20. When the clerk desires to weigh a commodity and use the computing unit for computing the value of the item to be weighed, the first step is to place the commodity on platter 16 and push the key which closes contact 143 and unlocks platter 16 as described above. After the platter has been unlocked, the operator closes terminal c which clears the keyboard logic and conditions the display for presentation of information. After the display unit has been cleared, the operator closes terminal pair representing the number of pounds for which a unit price are applied. For instance, if the price of the article being weighed is three pounds for $1.49, the clerk will push the bottom which closes terminal pair "3". This in turn will cause the number "3" to be entered into register 114 and also displayed visually thereon. Register 114 is similar in construction to registers 108 through 111 which have been described previously. There are also three other similar registers 115 through 117 which store and display the price for the weight unit entered into register 114. Registers 114 through 117 thus comprise the memory unit 55 which has been mentioned above. Thus for the case of the above example, registers 115 through 117 will be caused to display the numbers 1, 4 and 9. The numbers 1, 4 and 9 are entered into registers 115 through 117 by closing the terminals 1, 4 and 9 in seuqence; but only after first closing the "3" terminal as above mentioned and then closing terminal 123 which is the "pounds for" terminal.

As another example, if the article being weighed is priced at one quarter pound per 78 cents, the clerk closes terminals "143", "C", "1/4", "123", "0", "7" and "8". In the case where the "one quarter" or "one half" terminal pairs are closed, the computing unit will be required to multiply the article weighed by the unit price, and thereafter multiply the product by either 4 or 2, as the case may be. Thus if the "one quarter" terminal pair is closed, the binary number 0100 (which represents the decimal number 4) is entered into register 114 for subsequent transmission to computing unit 60. At the same time a HI is clocked into terminals C and D of register 124, which in turn causes a HI at output terminals QD and QC thereof and a LO output from NAND gate 125. A LO output from NAND gate 125 illuminates light emitting diodes 126 which displays the fraction "¼" on the face of display unit 20. A LO output from NAND gate 125 also causes production of a HI output from NAND gate 127. This HI output from NAND gate 127 blanks the visual display of register 114 and also causes a "one" to be gated into input terminal C3 of multiplexer 122. As described subsequently this bit at that particular location within multiplexer 122 is transmitted to the computing unit and used by the programming logic therein to generate a "multiply" command. It can be seen that as the clerk closes the "½" terminal pair a similar result will be achieved, with the binary representation for number "2" being entered into register 114, and a zero output being generated by a NAND gate 128, rather than from NAND gate 125. In further like manner, the zero output from NAND gate 128 causes a HI output from NAND gate 127 for blanking of the visual display on register 114 and gating of a "one" into terminal C3 of multiplexer 122. The zero output from NAND gate 128 also causes illumination of light emitting diode 129 which displays the fraction "½" on the face of display unit 20.

Loading of all of displays 114 through 117 is controlled by four lines 175 through 178, which in turn are output lines from AND gates 179 through 182. Registers 114 through 117 are loaded when lines 175 through 178 respectively go LO. AND gates 179 through 182 are enabled by an output from an AND gate 183 which is normally HI when the weight on platter 16 is above 0.02 pounds. AND gates 179 through 182 also have inputs from output terminals 2Y2, 1Y2, 1Y1, and 1Y0 respectively of a demultiplexer 119. Demultiplexer 119 may be a circuit SN74155, manufactured by Texas Instruments, and input terminals 1G and 2G thereof are strobe inputs. Input terminals A and B are "select" terminals, which cause selected output lines to go LO when corresponding input lines 1C or 2C are LO.

When the clerk additionally closes terminal C, this disables AND gates 179 through 182, thereby loading zeros into registers 114 and 117. The next key which is pressed by the clerk produces a LO output from terminal 2Y2 of demultiplexer 119, and this LO output causes the value corresponding to the display key to be loaded into register 114. There is a Schmitt trigger circuit 184, which is a clock for clocking keyboard entries through demultiplexer 119 and into the keyboard memory 55. Trigger circuit 184 may operate at a frequency of about 25 KHz, and the output of this circuit is counted by a counting network 185. However, a counting network 185 counts only up to four (i.e. the binary number 100), and holds this count until it is reset by an output from a latch circuit 186. Thus the first terminal pair which is closed after closure of terminal pair c, unlatches the latch 186, thereby clearing counter 185 and permitting the counter to count 4 counts. When input terminals B and A of demultiplexer 119 receive HI and LO inputs respectively from counter 185, then AND gate 179 is disabled, and the appropriate number is loaded into register 114. When the clerk then closes terminal pair 123 a LO output is produced by NAND gate 187. This produces a HI input at terminal 2C of demultiplexer 119, thereby prohibiting any further entry into register 114. Thereafter when the output from NAND gate 187 returns to its normal HI state latching circuit 189 latches input terminal 2C of demultiplexer 119 at the aforemention HI. This same HI is applied as one input to AND gate 188. The other input to AND gate 188 comes from NAND gate 187, so that when NAND gate 187 returns to its normal HI output, AND gate 188 is enabled, and thereby applies a HI input to terminal 1C of demultiplexer 119. Demultiplexer 119 is so constructed that the top half is enabled by a HI at input terminal 1C, whereas the bottom half is enabled by a LO at input terminal 2C. Thus by closing switch 123, the bottom half of demultiplexer 119 becomes disabled, while the top becomes enabled. Thereafter when the clerk closes any of contacts 0 through 9 of keyboard 144, a binary representation thereof is loaded into register 115 and displayed thereon. Each keyboard closure also unlatches the latching arrangement 186 clearing counter 185 and enabling a new count. The new count from counter 185 appears as a binary code at input terminals A and B of demultiplexer 119, thereby squentially disabling AND gates 182, 181 and 180 for loading of all of registers 117, 116 and 115. The output of register 115 is connected to the input of register 116, and the output of register 116 is connected to the input of register 117. This means that as each new price digit is loaded into register 115, the previously entered price digit is shifted up to register 116. Thus after three price digits have been entered, the total entered price appears in registers 117 through 115, with the most significant digit being stored and displayed in register 117.

Display unit 20 as illustrated in FIGS. 7A through 7H has a multiplexing network 62 comprising four multiplexers 188 through 191, as well as another multiplexer 82 and multiplexer 122, which has been discussed above. The weight information which is stored in registers 108 through 111 is supplied to multiplexers 188 and 189, and the status and price information stored in registers 114 through 117 is supplied to multiplexers 190 and 191. Multiplexers 188 through 191 are dual 4-line to 1-line data selectors and may be circuit types SN 74153, manufactured by Texas Instruments. In each case terminal 1Y is the output terminal for data appearing at input lines 1C0 through 1C3, and output terminal 2Y is the output terminal for data appearing at input lines 2C0 through 2C3. A two bit binary code appearing at input terminals A and B selects that one of the four input lines which will appear as an output on terminal 1Y and also selects that one of the four input lines which will appear as an output on output line 2Y. Terminals 1G and 2G are strobe terminals, and these terminals must be LO in order to enable any output to appear on terminals 1Y and 2Y.

As described subsequently computing unit 60 performs a 16 step computing program, each step of which commences with a transmission of a scale address to all of the scales communicating therewith. This scale address, as well as all other data transmitted by the computing unit is received on line 66 for handling by a dual line receiver 192, which together with another dual line receiver 95, may be a circuit type SN 75107 sold by Texas Instruments. The output from dual line receiver 192 is applied serially to the SI terminal of a five-bit shift register 193 for further application to a display unit address decoder 164. If, for example, the scale being addressed is scale number 5, then each program step will commence by loading into register 193 a code comprising the binary digits 0101, which will appear at output terminals QE through QB respectively. This code is applied to a four bit bi-stable latch 194 which may be a circuit type SN 7475 sold by Texas Instruments. Latch circuit 194 has its eight output terminals connected to a series of switches 195, which as illustrated will respond to a 0101 scale address by causing a LO output from NAND gate 196.

The LO output from NAND gate 196 enables dual line drivers 92 and 93 (which may be purchased together as a circuit type SN 75110 from Texas Instruments) to transmit data information and status information via line 65 to computing unit 60 and enables a NOR gate 197 and an AND gate 198 which are connected to the load terminal of a four-bit bi-stable latch circuit 94. Latch circuit 94 may be a circuit type SN 7475 sold by Texas Instruments and this latch circuit loads data address information generated by computing unit 60 as described below in connection with FIG. 9. This data address identifies one of the weight information registers 108 through 111 or one of the price information registers 115 through 117. This data address is received from computing unit 60 via line 66 and dual line receiver 192 for storage by shift register 193. It will be appreciated, however, that data address information transmitted by computing unit 60 cannot be stored in latch circuit 94 unless the correct display unit address has been received by decoder 164 to produce a LO output from NAND gate 196.

As described below in connection with Table II and FIG. 9, the timing system for computing unit 60 comprises 16 program steps designated P-0 through P-15, and each program step comprises 11 digit times designated D-11 through D-1. Each of the digit times in turn comprises 13 state times. Computing unit 60 transmits clock pulses to display unit 20 via a pair of lines 256 and 257 for receipt by dual line receiver 95. These clock pulses occur at the state time frequency and are applied by receiver 95 to a set of flip-flops 71 through 74 within a synchronizing network 63. Flip-flops 71 through 74 are in effect state time counters which count from 1 to 12 and then are reset.

The data signals which are received by dual line receiver 192 from line 66 include synchronizing pulses of two state times width at the end of each digit time and other synchronizing pulses of three state times width at the end of each program step. These synchronizing pulses are applied via NAND gate 78 to a set of flip-flops 75 through 77. The synchronizing pulses which occur between the digit times produce an output from the Q terminal of flip-flop 76, and this output is used as a count pulse for a four-bit binary counter 79. The synchronizing pulses of three state times width, which occur at the end of program steps, produce an output from the Q terminal of flip-flop 77, and this output clears counter 79. The count from counter 79 is applied to a decoder 81, which keeps track of the digit times D-11 through D-2 of FIG. 9. It is to be noted, however, that output line 0 of counter 81 goes LO during digit time D-11. Output terminal 1 goes LO at digit time D-10, and so on until digit time D-2 when output terminal 9 of decoder 81 goes LO.

Latch circuit 94 has four output terminals QA through QD which control the operation of multiplexing network 62. In this connection a binary code appearing at terminals QA through QC identifies the data to be transmitted to computing unit 60, while a bit stored in output terminal QD is used as a strobe. The binary code appearing at output terminals QA through QC of latch circuit 94 is supplied to input terminals A through C of multiplexer 82. Multiplexer 82 has eight input lines, which are connected to the 1Y and 2Y output terminals of multiplexers 188 through 191. Multiplexers 188 through 191 each have an input terminal A which is connected to the $\overline{Q}$ output terminal of flip-flop 72 and an input terminal B which is connected to the $\overline{Q}$ output terminal of flip-flop 73.

The state time count generated by flip-flops 71 through 73 results in a two-bit binary code which is applied to the A and B terminals of multiplexer 122 and all of multiplexers 188 through 191. As an example a LO input at both of terminals A and B of all of multiplexers 188 through 191 will cause output terminals 1Y to take on the state of input terminals 1C0 and will cause output terminals 2Y to take on the state of input terminals 2C0, providing that a LO strobe input is applied at terminals 1G and 2G. If the computing unit desires to receive the most significant digit of weight information (i.e. the data stored in register 111, then it will transmit for storage in latch circuit 94 a code which will cause multiplexer 82 to read the output from terminal 1Y of multiplexer 188. This can be accomplished by applying the binary code 000 to input terminals C, B and A of multiplexer 82 together with a LO strobe at terminal G thereof.

While the binary code 000 is applied to input terminals C, B and A of multiplexer 82, a series of four different two-bit binary codes are applied to input terminals A and B of multiplexer 188 to cause sequential appearance at output terminal 1Y of four binary bits representing the number stored in register 111. Similarly by storing other codes in latch circuit 94, the data stored in any of registers 108 through 111 or any of registers 114 through 117 may be transmitted in serial form through multiplexer 82. Output data from multiplexer 82 passes through a series of gates for application to dual line driver 92. Dual line driver 92 in turn transmits the data so generated to computing unit 60 via line 65. Such data is transmitted only during digit time D-8, because the strobe required for reading data out of multiplexer 82 can occur only during a LO output from terminal 3 of decoder 81. As mentioned above this terminal can go LO only during digit time D-8.

As described above the display system logic supplies status information to terminals C1 through C3 of multiplexer 122. Multiplexer 122 has a pair of input terminals A and B which recieve the same two bit codes supplied as above described to input terminals A and B of all of multiplexers 188 through 191. The strobe for multiplexer 122 is applied at terminal 1G thereof and occurs during a LO output from terminal 1 of decoder 81. This LO at terminal 1 of decoder 81 occurs during digit time D-10 of each program step, thereby enabling output terminal 1Y of multiplexer 122 to read out a four-bit code corresponding to the display system status. This status information is also applied to dual line driver 92 for transmission to computing unit 60 via line 65. All data bits supplied to driver 92 are also applied to the J and K terminals of a flip-flop 83. Flip-flop 83 in turn generates parity bits as required for odd parity, and these parity bits are applied to dual line driver 93. Dual line driver 92 is connected to line 65 as illustrated, so that parity bits are transmitted to computing unit 60 in proper sequence with data words and status words.

After computing unit 60 has computed the total value of a commodity being weighed, all as described in detail below, the total value information is transmitted over line 66 to dual line receiver 192. Receiver 192 applies this total value information, as serially received, to input terminal SI of of shift register 193, and also to a flip-flop 84. Flip-flop 84 is provided for a parity check, and causes a HI output from a NAND gate 87 if any parity error is detected. The value information which is shifted into shift register 193 is thereafter shifted into a memroy 58 comprising registers 96 through 99. These latter registers are provided with a visual display and may be similar in construction to registers 108 through 114. Registers 96 through 99 are loaded in sequence by LO outputs appearing at terminals 5, 6, 7 and 9 (digit times D-6 through D-3) of decoder 81. There is also a register 89 which is enabled for loading during occurrence of a LO output from terminal 4 of decoder 82 (i.e. during digit time D-7) and which receives any over value data which may be transmitted from the computing unit to the display unit. If an over value number is loaded into register 89, an output therefrom blanks all of displays 96 through 99.

A detailed schematic diagram of computing unit 60 is given in FIGS. 8A through 8H, which may be arranged into a single schematic as illustrated by FIG. 11. As shown generally in these figures, computing unit 60 comprises principally a computing logic network 68, a programming network 280, a display unit address generator 260, a data select unit 270, timing, multiplexing, and demultiplexing circuits as illustrated, a dual line receiver 261 which receives data from display units 20 via line 65, a dual line transmitter 262 which sends computed price information to display units 20 via line 66, and another dual line transmitter 237 which sends clock signals to display units 20 via lines 256 and 257. Transmitters 262 and 237 may be a common integrated circuit similar to transmitters 92 and 93 of display units 20. Dual line receiver 261 may be similar to receiver 192 of display units 20.

The heart of logic network 68 is a MOS/LSI Decimal Arithmetic Processor sold by Texas Instruments under the designation TMS 0117 NC. Circuit 200 has a first set of output terminals D1 through D11 and a second set of output terminals SA, SB, SC, SD, SE, SG, and SP. Circuit 200 is clocked via line 201 by a clock circuit 202 which operates at a frequency of 250 KHz. Terminals D1 through D11 provide timing control signals for external programming logic, as described below, and terminals SA through SD provide computational output data. Terminal SE provides a Ready/Busy signal, terminal SG provides a computational error signal, and terminal SP provides an output clock signal. The input terminals to circuit 200 are KQ, KP, KO, and KN, which are respectively used for data, enabling, reset, and decimal point. The input data is supplied serially to input terminal KQ in the form of serial five-bit-words. One of these five bits is a control bit which identifies the remaining four bits as being either numerical data or an instruction code. Table I below gives the input coding scheme for circuit 200 as set out in the manufacturer's data sheets. It will be seen that circuit 200 can be made to perform many different operations upon variable numerical input data, so that it is in effect a small digital computer.

TABLE I

INPUT CODING FOR ARITHMETIC PROCESSOR

| | numerical data | | | | instruction codes |
|---|---|---|---|---|---|
| 1st bit | 2nd bit | 3rd bit | 4th bit | 5th bit | meaning |
| 0 | 0 | 0 | 0 | 0 | 0 |
| 0 | 0 | 0 | 0 | 1 | 1 |
| 0 | 0 | 0 | 1 | 0 | 2 |
| 0 | 0 | 0 | 1 | 1 | 3 |
| 0 | 0 | 1 | 0 | 0 | 4 |
| 0 | 0 | 1 | 0 | 1 | 5 |
| 0 | 0 | 1 | 1 | 0 | 6 |
| 0 | 0 | 1 | 1 | 1 | 7 |
| 0 | 1 | 0 | 0 | 0 | 8 |
| 0 | 1 | 0 | 0 | 1 | 9 |
| 1 | 0 | 0 | 0 | 0 | Clear |
| 1 | 0 | 0 | 0 | 1 | Equals |
| 1 | 0 | 0 | 1 | 0 | Multiply |
| 1 | 0 | 0 | 1 | 1 | Divide |
| 1 | 0 | 1 | 0 | 0 | Add |
| 1 | 0 | 1 | 0 | 1 | Add 1 |
| 1 | 0 | 1 | 1 | 0 | Subtract |
| 1 | 0 | 1 | 1 | 1 | Subtract 1 |
| 1 | 1 | 0 | 0 | 0 | Add 1 to overflow |
| 1 | 1 | 0 | 0 | 1 | Substract 1 to zero |
| 1 | 1 | 0 | 1 | 0 | Shift right |
| 1 | 1 | 0 | 1 | 1 | Shift left |
| 1 | 1 | 1 | 0 | 0 | Exchange operands |

Figure 4:
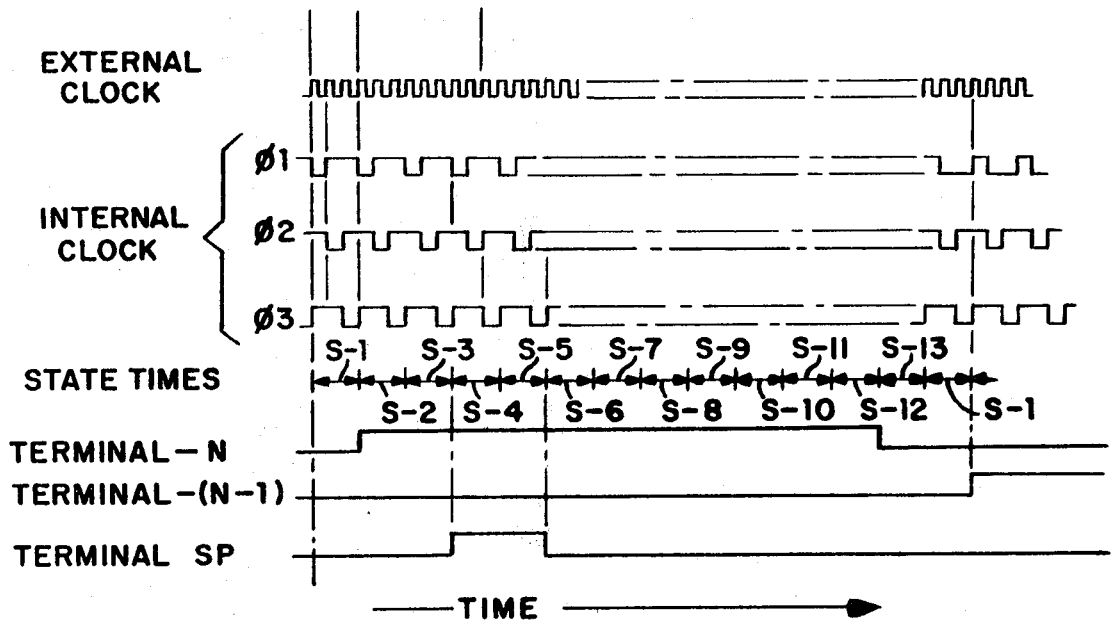
FIG. 4 is a timing diagram for a computing unit.

Reference may be made to the manufacturers data sheets for an understanding of the internal operation of circuit 200. For understanding the operation of circuit in connection with this invention, reference may be made to FIG. 4 which is taken from those data sheets and which presents a timing diagram for circuit 200. As indicated by FIG. 4, circuit 200 has an internal clock comprising three phases, which are phase shifted with respect to each other, each phase having a frequency one third that of the external clock. The period of the internal clock is referred to as a state time, and thirteen such state times comprise a digit time. A digit time is thus equivalent to 39 external clock periods or nominally about 156 microseconds. Programming for circuit 200 is accomplished as described below, and each program step spans a period of 11 digit times. Each complete computation requires 16 program steps, hereafter designated P-0 through P-15. The digit times are designated D-11 through D-1 (cycled in reverse order) and the program times are designated S-1 through S-13. Thus as used below the notation P-4, D-10, S-3 will be taken to refer to the third state time in the second digit time of the fifth program step.

The computational output data at terminals SA through SD of circuit 200 is supplied in digit serial, bit parallel B, C, D form, all numbers being presented with the most significant digit first. Circuit 200 may provide as many as 10 output digits during times D-10 through D-1, but as employed in connection with this invention only 5 output digits are used. These digits are taken out during times D-7 through D-3 and represent an "over value" digit and a maximum computed value of $99.99 rounded off to the nearest cent. Computed price data is made available for transmission to the appropriate display unit during program step P-15.

As indicated by FIG. 4, output terminals D1 through D11 of circuit 200 go HI for 11 state times on a sequential basis. Thus terminal D11 is HI for the time period S-2 through S-12 of digit time D-11. Two state times later terminal D-10 goes HI for the time period S-2 through S-12 of D-10. This continues through digit time D-1, after which the process repeats. This cyclic operation of terminals D1 through D11 causes appropriate sequential operation of programming network 280 which generally comprises a program counter 203, a demultiplexer 204, a shift register 205, and a set of gates 208, all as described in detail below. For the present purposes it is sufficient to note that the programming network provides circuit 200 with input codes of the general form illustrated by Table I, a new five-bit code being generated each program step and clocked through gates 208 during digit times D-10, D-7, D-5, D-3 and D-1. The program which is implemented by the programming network is set forth in Table II.

TABLE II

| Step. No. | PROGRAM Operation |
|---|---|
| P-0 | Clear Command |
| P-1 | Load 4th digit Wt |
| P-2 | Load 3rd digit Wt |
| P-3 | Load 2nd digit Wt |
| P-4 | Load 1st digit Wt |
| P-5 | Multiply function |
| P-6 | Load 3rd digit price/wt |
| P-7 | Load 2nd digit price/wt |
| P-8 | Load 1st digit price/wt |
| P-9 | Divide (or multiply) function |
| P-10 | Load "pounds for" (or ¼, ½) digit |
| P-11 | Plus function |
| P-12 | Load digit 5 |
| P-13 | Load digit 0 |
| P-14 | Equal function |
| P-15 | Non operate function (11101) |

Referring now to Table II it will be seen that the first step in the program (P-0) causes generation of a clear command for arithmetic processor 200. As shown by Table I, the input coding for such a command is 10000. During this period of time, a LO output appears at terminal 0 of demultiplexer 204, while all other terminals of the demultiplexer are HI. During the next 15 program steps output terminals 1 through 15 of demultiplexer 204 go LO in sequence, so that the demultiplexer functions as a programmer for arithmetic processor 200. The output terminals from demultiplexer 204 are connected to a gating arrangement 209 which in turn are connected to terminals A through E of shift register 205. It will be seen that for a LO at terminal 0 of demultiplexer 204 and a HI at all other terminals thereof, gating arrangement 209 is caused to provide a code 10000 to shift register 205.

Shift register 205 may be an integrated circuit such as a circuit sold by Texas Instruments under the designation SN7496 N. This circuit accepts a parallel input at terminals A through E and a series input at terminal SI. Series input data is applied to terminal SI during state times S-3, S-5, S-7 and S-9 of digit time D-8 for program steps P-1, P-2, P-3, P-4, P-6, P-7, P-8 and P-10. This data is clocked into register 205 by clock pulses supplied to terminal T thereof, and the data becomes available for parallel readout at terminals QA through QE; the bit serially so loaded for readout at terminal QE always being a zero to signify numerical data.

Shift register 205 also has a clear terminal C, which is cleared by a pulse appearing thereat during D-11, S-3 of every program step, and a common preset terminal L which receives a HI input at D-11, S-9 of program steps P-0, P-5, P-9, P-11, P-12, P-13, P-14 and P-15. When these HI inputs are received at terminal L, terminals QA through QE are independently set to correspond to the inputs appearing at input terminals A through E. Thus at P-0, D-11, S-9 terminals QE through QA are set with the code 1000 which is being generated at that time by gating arrangement 209. This code then is serially gated through gating arrangement 208 for application to input terminal KQ of circuit 200. The 5 binary bits representative of this code are gated consecutively through gates 208 under the control of HI outputs appearing during state time S-2 through S-12 of digit times D-10, D-7, D-5, D-3 and D-1 respectively at terminals D10, D7, D5, D3 and D1 of circuit 200. A matching network 206 provides a level shift for applying the outputs of circuit 200 to the gates 208. Another matching network 210 provides a level shift for applying the serial code 10000 circuit 200. The serial code then is interpreted by circuit 200 as a clear command.

Referring again to Table II, it will be seen that the next program step (P-1) involves loading the 4th digit of weight into circuit 200. For a weight of 12.37 lbs., the 4th weight digit would be "1", and therefore the completion of program step P-1 requires loading a "0" control bit into circuit 200 and following this control bit by the binary code 0001. Accordingly the system proceeds by generating a clear command for terminal C of shift register 205 during the time period P-1, D-11, S-3, and then loading the weight code 0001 serially into terminal SI of shift register 205. This weight code is generated by an addressed display unit 20 and is sent via line 65 as previously discussed with reference to FIGS. 7A through 7H. The code is received by register 205 during state times S-3, S-5, S-7, and S-9 of digit time D-8. During this program step no signal is applied to the common preset terminal L of register 205, so that the serially received weight data is loaded for readout at terminals QA through QD together with a naturally occurring 0 at output terminal QE. Thus a code 00001 is supplied to gates 208 and is clocked out therefrom under the control of outputs appearing consecutively at terminals D10, D7, D5, D3 and D1 of circuit 200.

After the fourth weight digit has been entered in circuit 200 as described above, the system proceeds with steps P-2, P-3, and P-4 as shown in Table II. During these steps the system loads the third, second, and first weight digits into circuit 200 in the same manner as described above with reference to the loading of the fourth weight digit. Then the system proceeds to generate a multiply command for application to input terminal KQ of circuit 200. As shown by Table I the multiply command is represented by the binary code 10010. This multiply command during program step P-5 is generated in a manner analogous to the generation of a clear command during program step P-0. During step P-5 output terminal 5 of demultiplexer 204 is LO, and the other output terminals of demultiplexer are HI. These outputs from demultiplexer 204 cause the gating network 209 to generate a code 10010 for input terminals A through E of shift register 205. Thereafter during P-5, D-11, S-9, a HI signal appearing at terminal L of shift register 205 causes the inputs at terminals A through E to be loaded for output at terminals QA through QE. Again the binary code is gated through gating network 208 as previously described.

After the multiply command has been entered into circuit 200, then three price digits are entered, entry occurring during program steps P-6, P-7, and P-8, these price digits represent either price per pound, price per fraction of a pound, or price per a plurality of pounds as indicated by data loaded into terminals D through A of register 114 and terminal C3 of multiplexer 122 of the addressed display unit 20. The three price digits are loaded into circuit 200 in like manner as the loading of the four weight digits. Thereafter the system generates a divide or multiply command, depending upon whether the price information is for a fraction of a pound or for an integral number of pounds. If the price is for a fractional number of pounds as for instance 29 cents per one-half pound, then a multiply command is generated. If, on the other hand, the price digits represent a price per integral number of pounds such as $1.20 per pound, $1.83 per three pounds, etc., then a divide command is generated. Again referring to Table I it will be seen that a divide command is represented by the binary code 10011, while the multiply command again is 10010. As discussed below in connection with the description of FIG. 9, a requirement for the multiply function is indicated by the presence of a HI signal received from the addressed display unit during D-10, S-9 of each program step. Such a HI during program step P-9 sends the $\overline{Q}$ output of flip-flop 211 LO. Flip-flop 211 thus serves as a fraction memory. The LO output from flip-flop 211 is applied to an input terminal of NAND gate 212, causing a HI output therefrom. This HI output is applied to gating network 209 to cause a LO input to terminal A of shift register 205. This LO then is shifted to output terminal QA to cause generation of a multiply command during program step P-9. If the price entered during program steps P-6 through P-8 represents the price for an integral number of pounds, then the transmission system provides computing unit 60 with a LO signal at time D-10, P-9, which causes flip-flop 211 to generate a HI output at its $\overline{Q}$ terminal. During program step P-9, this HI is sensed by NAND gate 212 together with another HI which is generated only during program step P-9. This causes a LO output from NAND gate 212 and generation of the divide command 10011 at the output terminals of shift register 205.

During program step P-10 the computer loads a number representative of either the integral number of pounds for which the entered price data applies, or else either a four or two (in binary form) representing price per one-fourth pound or price per one-half pound. This number is read out from register 114 of the addressed display unit and need not be further interpreted by circuit 200. As an example, suppose that a product weighs 12.37 pounds and is priced 84 cents per one-half pound. Under such circumstances circuit 200 will be loaded representing with binary codes representing the numbers 1, 2, 3, and 7 during program steps P-1 through P-4, and will be loaded with a binary code representing the digits 0, 8 and 4 during program steps P-6 through P-8. Circuit 200 then will be loaded with a multiply command during program step P-9, and it will be loaded with a binary number representing the number two during program step P-10. This tells the computer to load the number 1237, multiply this number by 84, and multiply the product by 2. No decimal point information is entered, as the display logic automatically takes care of decimal placement.

During program step P-11 the system enters the plus command 10100 into circuit 200, and this is followed during program steps P-12 and P-13 by loading of binary numbers representing the digits 5 and 0. This addition of the number 50 is a rounding-off procedure, which is necessary in view of the fact that the display system will not display prices less than an integral number of cents. Steps P-11 through P-13 thus cause any price of 0.5 cents or more to be interpreted as a full cent. During program step P-14 the system generates the equal function 10001, and during program step P-15 the system operates the code 11101 which is a non operate function. During program step P-15 the computed price appears at output terminal SA through SD of circuit 200 for parallel application to AND gates 213 through 216 of data select unit 270. Terminals SA through SD are matched to AND gates 213 through 216 by a matching network 207. The most significant digit appears at terminal SD, and the least significant digit appears at terminal SA. This data is multiplexed and transmitted to the addressed display unit most significant digit first.

AND gates 213 through 216 are enabled during digit times D-7 through D-3 of program step P-15 and, during these times the information appearing at terminals SA through SD of circuit 200 is applied to OR gates 217 through 220 and inverters 221 through 224. These parallel outputs from inverters 221 through 224 are applied respectively to terminals 9, 7, 5 and 3 of a multiplexer 225. A four-bit binary counter 226 applies a binary code to input terminals A through D of multiplexer 225 to cause the above mentioned four input signals to be read out serially onto output terminal W which is connected to driver 262, and to a flip-flop 227. Flip-flop 227 generates a parity bit for application to input terminal 11 of multiplexer 225.

FIG. 9 illustrates the signals which are transmitted from computer 60 to one of the keyboard display units 20 and also the signals which are received by the computer from the display unit. The period of time represented by FIG. 9 encompasses any one of the 16 program steps, it being understood that not all of the illustrated data will be transmitted during any given program step and that the numbers 1 through 13 under each digit time represent correspondingly numbered state times. The solid lines denote data transmitted by driver 262, and the dotted lines represent data received by receiver 261 from the addressed display unit.

All data represented by solid lines in FIG. 9 is multiplexed onto output terminal W of multiplexer 225 from input terminals 0 through 12 thereof. The four bit binary code which is applied to terminals A through D selects the input terminals for the multiplexed output, and this code is stepped in sequence with state times within each digit time. The code, however, begins at S-13 of each digit time and continues through S-12 of the following digit time. Thus it will be seen that terminal W of multiplexer 225 has a LO output during S-1 and S-13 of each digit time. These two LO outputs in turn cause a HI output of two state times width from driver 262, and this output serves as a digit time synchronizing signal for the addressed display unit. It will also be seen that input terminal 12 of multiplexer 225 is connected to output terminal D1 of circuit 200, which is HI during S-2 through S-12 of D-1. This means that driver 262 also transmits a HI on line 66 during S-12 of D-1 to create a synchronizing pulse of three state times width between program steps.

The first information segment shown on FIG. 9 represents a display unit address which is transmitted by computing unit 60 during digit time D-11 of every program step. The display unit address information goes to all display units 20 connected to the computing unit and is contained in data bits transmitted during state times S-3, S-5, S-7 and S-9. During state times S-11 of D-11 a parity bit is also generated as required for an odd parity check. Each display unit connected to computing unit 60 has its own address and will respond with status information when its address has been received.

Scale status information occupies the second information segment shown on FIG. 9 and is processed by computing unit 60 during state times S-3, S-5, S-7, S-9 and S-11 of digit time D-10. This status information is sent by an addressed display unit every time its address is received, so that one or another of the various display units transmits status information during every step of the program. Then the computer is continually checking scale status information. At any time when satisfactory status information is not received, the computer aborts the program and begins communication with a new display unit.

The first piece of scale status information processed by computing unit 60 is a parity bit which may be transmitted by the addressed display unit during state time S-2. The computer looks at this bit position at state time S-3. A bit (i.e. a "a") in this position indicates that the display unit has detected a parity error. Accordingly if the computer detects a bit in this position during any program step, the program is set back to step P-O and a new display unit is addressed.

The second and third pieces of scale status information which are processed by the computer are "data invalid" and "compute command" bits, which are processed digit time D-10 during state times S-5 and S-7 respectively. If the computer processes a "1" during either of these times, it is treated exactly like the above mentioned parity error, thereby causing program abort. A bit in the "data invalid" position means either that the scale is out of range, or is in motion or that there has been a keyboard change. A bit in the "compute command" position means either that there has been a keyboard change, or scale motion has been detected, or that the scale system logic has detected a parity error.

If the computer receives a bit for processing during state time S-9 of digit time D-10, it means that register 114 of the addressed scale system has been loaded with fractional pound data and that a status bit indicating this fact has been multiplexed into terminal C3 of multiplexer 122. As previously discussed, this information is used during program step P-9 to create a mutiply command for arithmetic processor circuit 200.

Finally during state time S-11 of digit time D-10 of all program steps the computer makes a parity check. The addressed display unit places a bit in this position as required to satisfy an odd parity check, and if the computer detects an even parity, then there is a program abort.

During digit time D-9 computint unit 60 sends a digit address to the display unit with which it is communicating. The digit address is transmitted to all display units but can be received and interpreted only by that one of the scales which was addressed during digit time D-11. The digit address is a binary code transmitted during state times S-3, S-5, S-7 and S-9. A parity bit is also transmitted if required during state time S-11. The digit address tells the addressed display unit which one of eight different stored digits the computer desires to receive. Referring again to Table II it will be seen that such digit addresses are sent during program steps P-1, P-2, P-3, P-4, P-6, P-7, P-8 and P-10, and these addresses respectively address registers 111, 110, 109, 108, 117, 116, 115 and 114. During program step P-6, for instance, the computer asks for the dollars portion of the price information, and to address register 111 which holds that information, the computer will transmit the code 01000 digit time D-9.

During digit time D-8 the addressed display unit transmits to the computer a binary code representing the digit stored in the register addressed during digit time D-9. Again, the information is transmitted in four bits, most significant bit first, followed by a parity.

During digit times D-7 through D-3 computing unit 60 ordinarily sends only synchronizing bits to the addressed display unit. As described above these synchronizing bits are set during state times S-1 and S-13 to create a pulse of two state times width between digit times. However, this lack of information data during digit times D-7 through D-1 holds only during steps P-0 through P-14.

During program step P-15, the computer transmits to the addressed display unit a binary code representing the total value of a commodity being weighed. This data is transmitted during digit times D-7 through D-3 of program step P-15. The data sent during digit time D-7 represents an "over value" digit which is the next digit greater than the most significant digit. As described herein, the display unit is limited to a maximum displayed price of $9.99. If the computer computes a total value of between $10.00 and $19.99, a binary representation of the decimal digit "1" will be transmitted (together with a parity bit) during time D-7. Receipt of any "over value" digit by display unit 20 blanks the computed value display as described above. Except for the above mentioned synchronizing bits, no data is transmitted over transmission lines 65 and 66 during digit times D-3 and D-1.

Referring again to FIGS. 8A through 8H, it will be seen that program step counting is performed by a four-bit binary counter 203. This counter conveniently may be a circuit type SN 7493 sold by Texas Instruments. For this particular application, output terminal A is tied to input terminal T-2 (referred to as input B in the manufacturer's data sheets). A clocking input for counter 203 is provided at terminal T1 from a flip-flop 228, and clock pulses are received during digit time D-11. As previously described, the four outputs from counter 203 are applied to demultiplexer 204, causing LO outputs to appear sequentially at output terminals 0 through 15 thereof. Thus during program step 3, for instance, the output at terminals D through A of counter 203 read 0011, and output terminal 3 of demultiplexer 204 will be LO. All other output terminals of demultiplexer 204 will be HI at this time.

Counter 203 has two clear terminals C1 and C2, and the counter is reset to 0 whenever a HI signal appears simultaneously at these two clear terminals. Terminal C1 is connected to terminal D11 of circuit 200, so that terminal is HI during state times S-2 through S-12 of digit time D-11. Accordingly, counter 203 will be reset to 0 if a HI input appears at terminal C2 during this period of time.

Terminal C2 of counter 203 is connected to the Q output of flip-flop 229. Flip-flop 229 serves as a "data invalid" memory, and output terminal Q thereof goes HI on any of the following conditions: (1) receipt of a "data invalid" signal from the addressed display unit (i.e. a data bit received during D-10, P-5; as mentioned above the display unit generates such a data bit for scale motion, scale out-of-range, or parity error), (2) parity error in data received from scale, or (3) error output from terminal SG of circuit 200.

Flip-flop 229 is triggered at time D-11, S-3 by a signal inverting amplifier 230. The J input terminal of flip-flop 229 is connected to the output of a NAND gate 231, and signals representing the above mentioned three data invalid conditions are supplied at inputs to NAND gate 231. A HI output from NAND gate 231 during occurrence of a trigger at terminal T of flip-flop 229 causes a HI output at terminal Q of flip-flop 229, thereby resetting counter 203 and causing a program abort. Accordingly continued progression through the 16 step computing program requires that HI signals be present at the three inputs to NAND gate 231 at state time S-3 of all digit times D-11. In the event of an error by arithmetic processor 200, NAND gate 231 will receive a LO input from inverting amplifier 232. A data invalid signal from the addressed display unit (i.e. a bit in any of positions S-3, S-5 or S-7 of the signal received during digit time D-10) will cause a LO output on the $\bar{Q}$ terminal of flip-flop 233, and a parity error in the data received from the display unit will cause a LO output on the $\bar{Q}$ terminal of flip-flop 34. By this means the computing unit minimizes lost time in communicating with any display system not in condition for servicing.

The computing unit as illustrated in FIGS. 8A through 8H has a state time counting system comprising a counter 235 and a gating network 236. Counter 235 receives a 250 KHz clock signal from time clock 202 and divides this clock by three to provide suitable clock signals to clock transmitter 237, counter 226, and gating network 236. Gating network 236 receives a four-bit BCD code from the counter 226 as well as the above mentioned clock signal from counter 235 and generates outputs on five lines 238 through 242. Line 238 carries a pulse during state time S-3 of all digit times. Line 239 carriers pulses at state times S-3, S-5 and S-7 of all digit times. Similarly lines 240 241 and 242 carry pulses during all digit times. For line 240 the pulses appear at state times S-3, S-5, S-7, S-9 and S-11; for line 241 the pulses appear at state times S-3, S-5, S-7, and S-9; and line 242 carries a pulse at state time S-9 only. These pulses on lines 238 through 242 are used for gating purposes as illustrated by the connections shown on FIGS. 8A through 8H.

Figure 8B:
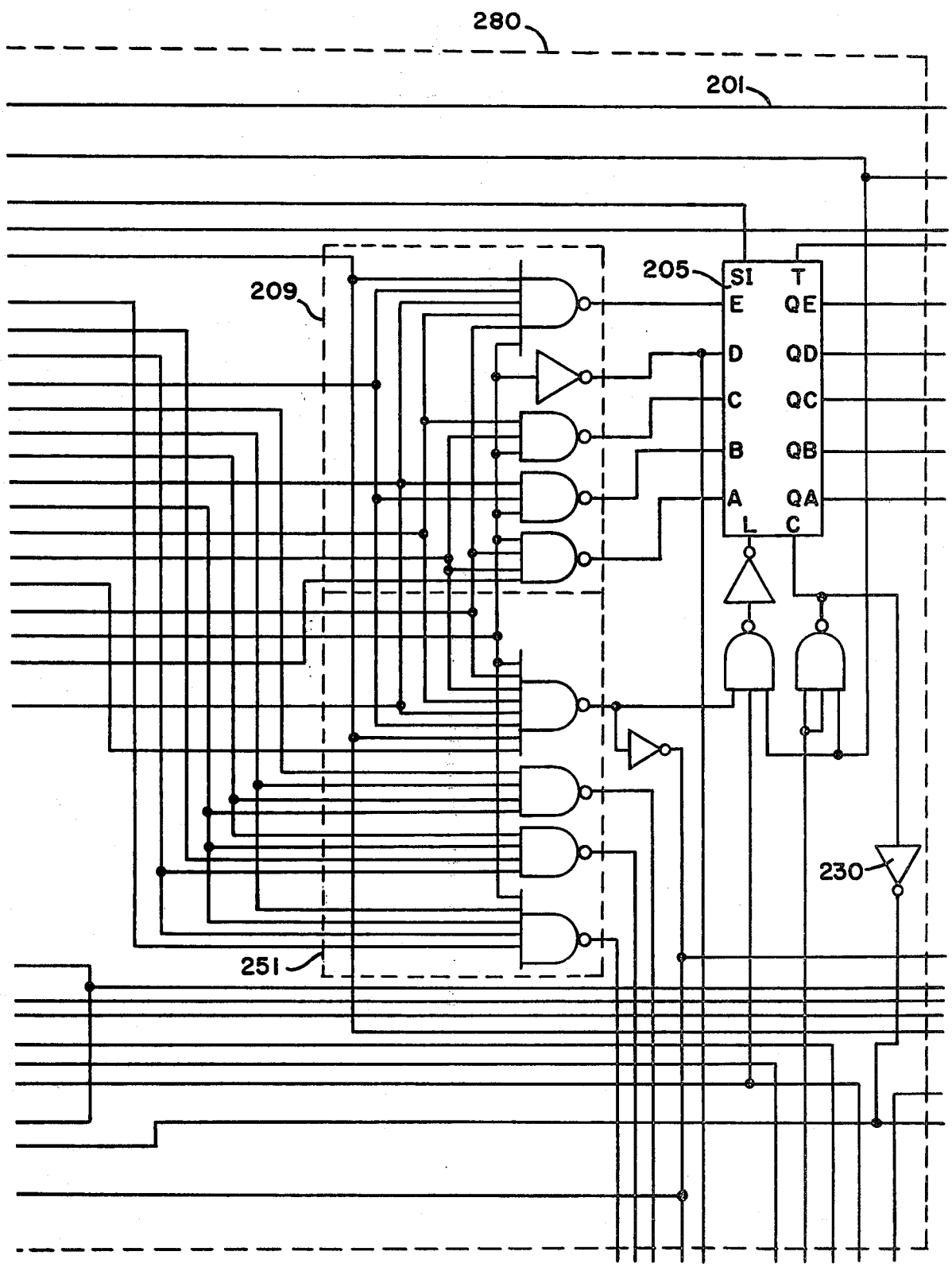
Figure 8C:
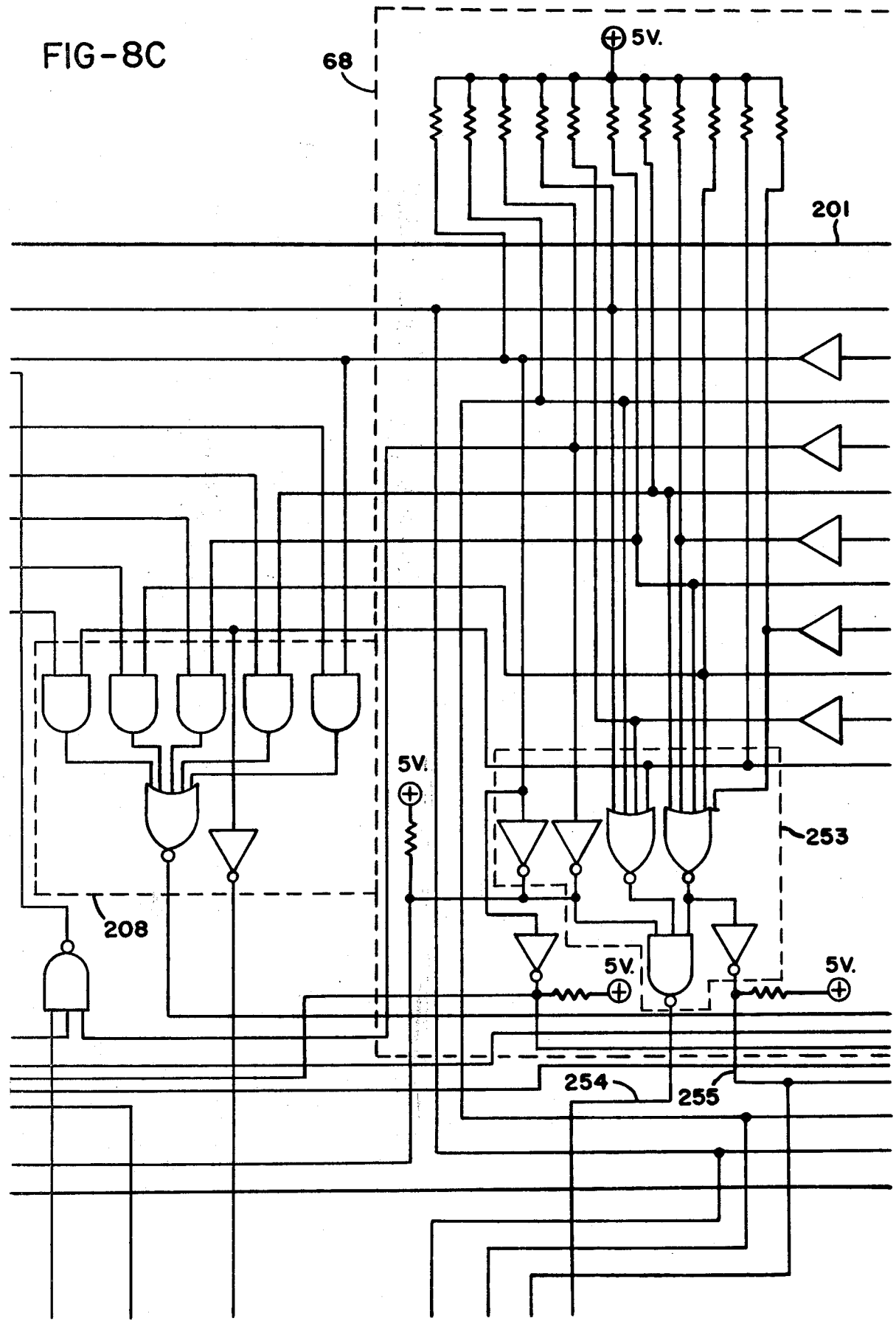
Figure 8D:
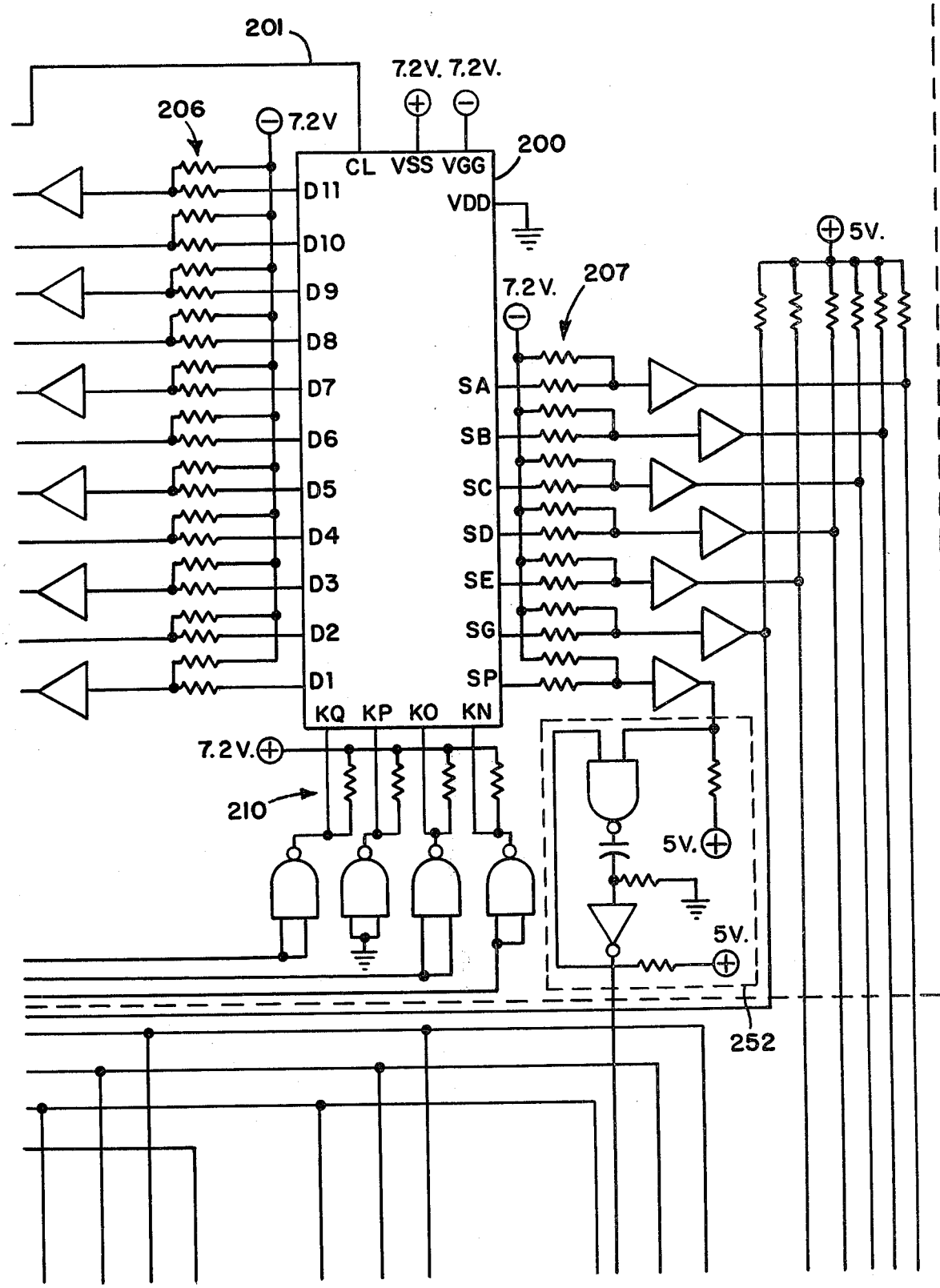
Figure 8E:
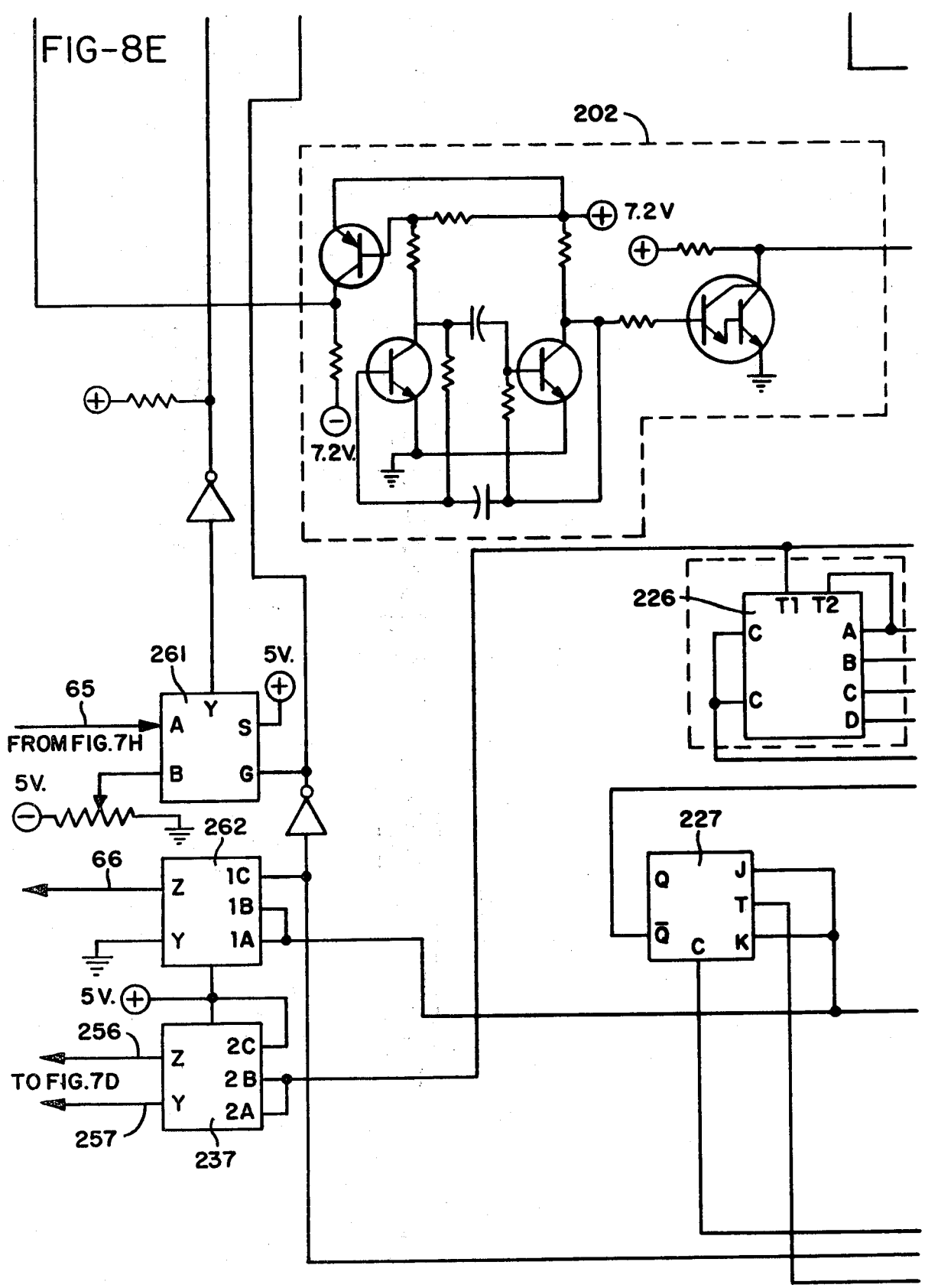
Figure 8G:
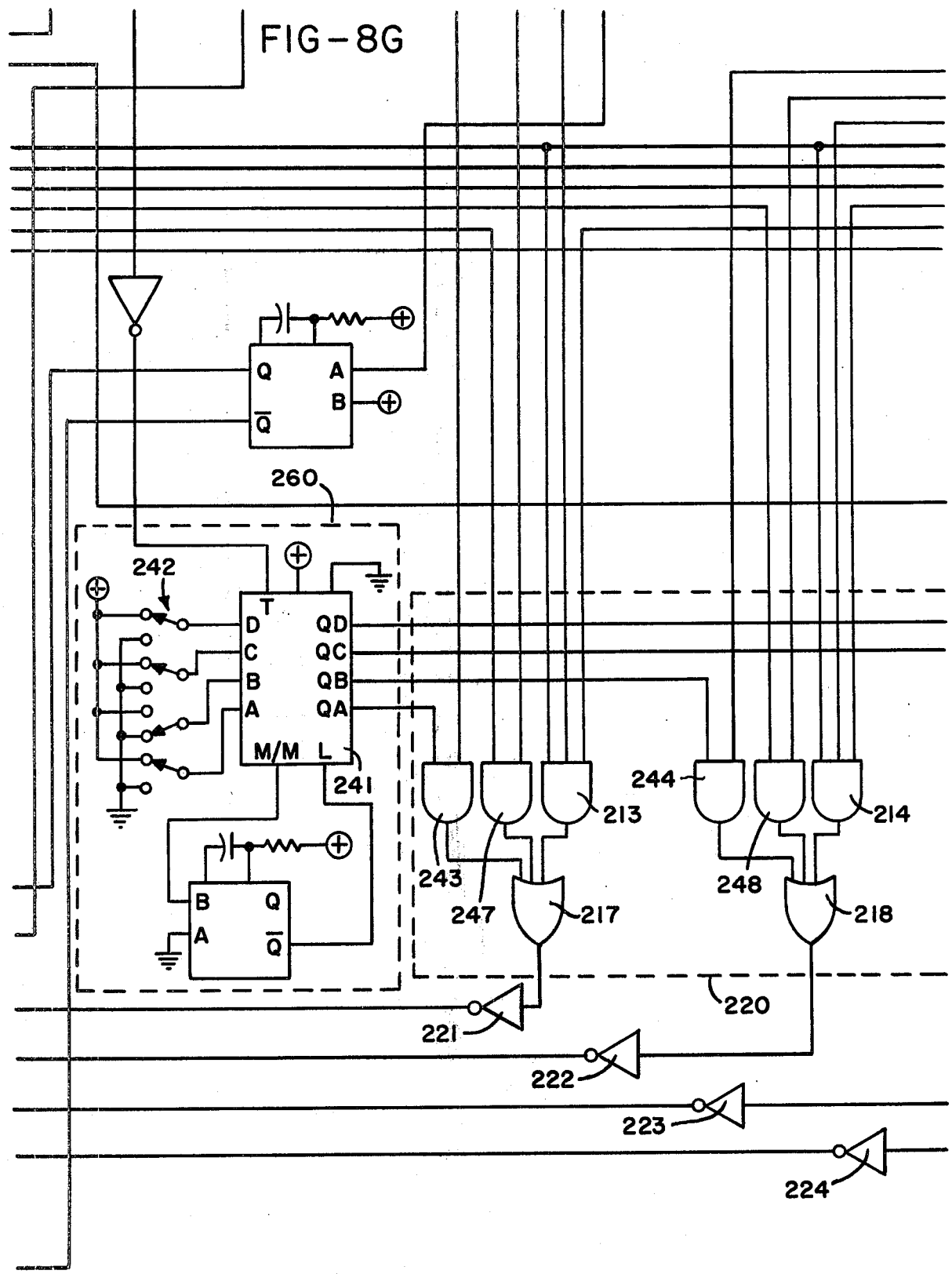

In order to generate a display unit address for transmission to the display units during digit time D-11 of each program step, the computing unit is provided with a synchronous up/down counter 241 which may be a circuit type SN 74191 sold by Texas Instruments. Input terminals A through D of counter 241 are connected to a series of switches 242, which may be set in accordance with the number of display units to be addressed. As illustrated in FIG. 8G, the switches 242 provide counter 241 with a four-bit binary code 1101 corresponding to the number 13. Accordingly counter 241 counts from 13 down to 0, and then returns again to the number 13. The output count appears at terminals QA through OD of counter 241 which are connected to AND gates 243 through 246. AND gates 243 through 246 are enabled by an output from circuit 200 during digit time D-11 and thus can address anyone of 14 different display units during that digit time. The output from AND gates 243 through 246 are provided as inputs to OR gates 217 trough 220 for handling in a manner similar to the handling of the computer total value data as discussed above.

The digit address data which is transmitted by the computing unit to the addressed display unit during digit time D-9 is supplied to AND gates 247 through 250, which in turn are connected to OR gates 217 through 200. AND gates 247 are enabled by an output from terminal D-9 of circuit 200, and receive digit address information from a gating network 251. Gating network 251 comprises a set of four NAND gates connected on their input sides to the output terminals of demultiplexer 204. As described above, the outputs of demultiplexer 204 assume a LO state sequentially in accordance with the program step being effected. The digit address generated by gating network 251 for any given program step may be easily seen by following the connections shown in FIGS. 8A and 8B, and further description thereof is deemed unnecessary.

Further understanding of the timing within the computing unit may be had by noting that counter 235 is cleared each D-11 time period at the trailing edge of state time S-5 by a pulse generated by a pulse from network 252. Also contributing to program timing is a gating network 253 which has a first output on a line 254 and a second output on a line 255. The signal on line 254 is a $\overline{D1-D11}$ which in effect is a HI during state times S-1 and S-13 of all digit times. The signal on line 255 is HI from the period D-3 through D-7.

While the method herein described, and the form of apparatus for carrying this material into effect, constitute preferred embodiments of the invention, it is to be understood that the invention is not limited to this precise method and form of apparatus, and that changes may be made in either without departing from the scope of the invention.

What is claimed is:

1. A computing scale system comprising
   a plurality of scales for weighing articles at diverse locations,
   a plurality of display units each corresponding to one of said scales and comprising means for entering a price per unit weight of an article being weighed on the associated scale, and means for displaying a computed value for said article,
   computing means for multiplying a measured weight by a price per unit weight to obtain a computed value of an article represented by said weight and said price per unit weight,
   transmission means connecting said computing unit to said scales and said display units on a time sharing basis, so that said computing unit computes the article values required for display by each of said display units and transmits said values back to the correct displays,
   display unit address means adjustable for generating display unit addresses designating different ones of said display units and connected for transmitting said addresses on a sequential basis over said transmission means to said display units, and
   decoding means associated with each of said display units and connected to said transmission means for enabling communicating of a display unit with the computing means only when its associated decoding means has received the address which designates said display unit.

2. Apparatus according to claim 1, each of said display units comprising first storage means for storing the weight measured by the associated scale, second storage means for storing the price per unit weight entered as aforesaid, and means for reading out the contents of both of said first and second storage means onto said transmission means for transmission to said computing unit.

3. Apparatus according to claim 2 said computing unit comprising a clock for timing the operation of said computing unit and the unloading of weight and price information from said display unit, said display unit comprising a clock for controlling the loading of price information into said second storage means, and said scale comprising a clock for controlling the readout of said weight information and the loading of said weight information into said first storage means.

4. Apparatus according to claim 1 each of said display units comprising status generating means for generating and supplying to said transmission means a display unit status signal whenever the decoding means associated with said display unit receives and recognizes its display unit address.

5. Apparatus according to claim 4, said computing unit comprising digit addressing means for generating digit address codes identifying the numerical data which the computing unit is ready to process, and said decoding means each comprising first code recognition means for recognizing the address designating the associated display unit and second code recognition means for recognizing said digit address codes and operative, under control of said first code recognition means, to supply the identified numerical data from the associated display unit to said transmission means.

6. Apparatus according to claim 5, said computing unit comprising an arithmetic processing circuit and a programming network for controlling the operating sequence of said arithmetic processing circuit, said display unit address generator and said digit address generator; each step of said operating sequence beginning with transmission of a display unit address code and a scale system signal responsive thereto.

7. Apparatus according to claim 6 said computing unit comprising means for producing a program abort whenever a received display unit status report fails to meet predetermined criteria for continued operation, and said programming network being configured for causing said arithmetic processor to continue servicing the same display unit until either a required article value has been computed or a program abort has been produced.

8. Apparatus according to claim 7 said computing unit comprising means to cause said display unit addressing means to address a new display unit whenever an article value computation has been completed or a program abort has been produced.

9. Apparatus according to claim 4 said status signal indicating whether or not the addressed display unit is in condition for servicing by said computing unit, a negative indication being generated when the weight of said article is out of scale range of when the measured weight is changing.

10. Apparatus according to claim 1, said transmission means being connected for transmitting weight in serial form from each scale to its associated display unit, for transmitting weight and price per unit weight information in serial form from the display units to said computing unit, and for transmitting computed value information in serial form from the computing unit to said display unit.

11. Apparatus according to claim 10, said display unit comprising means to provide said transmission means with serialized information representative of the weight unit for which said price per unit weight applies.

12. Apparatus according to claim 1, the platter of said scale being normally locked in an inhibited movement condition, and said display unit comprising means to release said platter for weighing an article placed thereon.

13. Apparatus according to claim 12 said scale comprising means for automatically relocking said platter upon removal of said article therefrom.

14. A method of servicing a plurality of display units each containing stored information digits representative of the weight of an article being sold and stored price digits representative of the price per unit weight of said article comprising:
1. generating from within a common computing unit a display unit address signal unique to only one of said display units and sending said address signal to all of said display units,
2. processing said display unit address at all of said display units to determine which unit has been addressed and conditioning said display unit to receive instructions from said computing unit,
3. transmitting from the addressed display unit to said computing unit a status signal indicating readiness of said unit to be serviced by said computing unit,
4. generating a new display unit address if the previously addressed display unit is not ready for servicing, and if the previously addressed display unit is ready for servicing, then generating from within said computing unit a digit address code identifying one of said digits stored in the addressed display unit,
5. transmitting from the addressed display unit to said computing unit a signal representative of aforesaid digit,
6. repeating steps 2 and 3 above, and generating a new display unit address if the previously addressed display unit is no longer in condition for servicing, but if said display unit is still in condition for servicing, then generating a new digit address code identifying another one of the digits stored in said display unit,
7. transmitting from the addressed display unit to said computing unit a signal representative of said another digit,
8. repeating steps 6 and 7 until said display unit transmits a status signal indicating non readiness for servicing or or until all of the weight and price digits stored therein have been transmitted to said computing unit, and generating a new display address code upon occurrence of the former condition, but in case of the latter condition, then causing said computing unit to multiply the weight of said article by the price per unit weight thereof to obtain a total article value,
9. transmitting a signal representative of said total article value from the computing unit to said display unit,
10. generating a new display unit address and repeating steps 1 through 9 for a new display unit, and
11. continuing the above process until all display units have been serviced.

15. A method according to claim 14 all of said signals being in serialized binary form.

16. A method according to claim 14, said status signal indicating non readiness for servicing if said stored information weight is outside a predetermined range or is changing.

17. In a computing scale system comprising a display unit for displaying weight, price per unit weight, and total value of an article being weighed, scale means for weighing said article and communicating the weight thereof to said display unit, and a computing unit for computing the value of said article and transmitting said value to said display unit; the improvement wherein said computing unit comprises an adjustable display unit address means for generating different display unit addresses to enable use of said computing unit for servicing a plurality of display units and said display unit comprises decoding means for decoding its particular display unit address and preventing reception of said computed value unless said address meets predetermined acceptance criteria.

18. The improvement of claim 17 said computing means comprising means for determining the status of said display unit and generating said other display unit addresses in a predetermined sequence when said display unit status fails to satisfy predetermined criteria for computing support.

19. A merchandise checkout system comprising:
a. a checkout counter,
b. a scale including a platter which in the unloaded condition is level with said counter and means for inhibiting movement of said platter from said level position,
c. means for releasing said platter when an article thereon requires weighing and price calculation,
d. a display unit comprising
  i. a keyboard for entering the price per unit weight of said article,
  ii. first storage means for storing the price per unit weight entered by said keyboard and providing a visual display thereof,
  iii. second storage means for storing the weight of said article as measured by said scale and providing a visual indication thereof,
  iiii. third storage means for storing a computed value of said article and providing a visual indication thereof,
e. computing means for multiplying the price information stored in said first storage means by the weight information stored in said storage means to determine said article value;
f. first transmission means for serializing the information stored in said first and second registers and transmitting said information in serial form to said computing means thereby enabling performance of aforesaid multiplication, g. second transmission means for serializing the information representing said computed article value and transmitting said information in serial form to said display unit for storage and display by said third storage means, and
e. third transmission means for converting the weight measured by said scale into a serial binary code and transmitting said code in serial form to said second storage means.

20. A merchandise checkout system according to claim 19, said keyboard comprising means for entering said price per unit weight in terms any one of a plurality of different weight units, said display unit comprising fourth storage means for storing information indicative of the selected weight unit, said first transmission means comprising means for serializing of said selected weight unit information for transmission to said computing means, and said computing means comprising means for performing a further computation to account for the weight unit so selected.

* * * * *